United States Patent
Iyoda et al.

(10) Patent No.: US 8,015,275 B2
(45) Date of Patent: Sep. 6, 2011

(54) COMPUTER PRODUCT, METHOD, AND APPARATUS FOR MANAGING OPERATIONS OF SERVERS

(75) Inventors: Satoshi Iyoda, Kawasaki (JP);
Yoshinobu Hibi, Kawasaki (JP);
Mamoru Yokoyama, Kawasaki (JP);
Hiroshi Yazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 30 days.

(21) Appl. No.: 12/133,204

(22) Filed: Jun. 4, 2008

(65) Prior Publication Data
US 2008/0244068 A1 Oct. 2, 2008

Related U.S. Application Data

(63) Continuation of application No. PCT/JP2005/024073, filed on Dec. 28, 2005.

(51) Int. Cl.
*G06F 15/173* (2006.01)
*G06F 15/16* (2006.01)
(52) U.S. Cl. ......... 709/223; 709/203; 709/224; 718/105
(58) Field of Classification Search .......... 709/202–203, 709/223–224; 718/105
See application file for complete search history.

(56) References Cited

U.S. PATENT DOCUMENTS

| | | | |
|---|---|---|---|
| 6,363,388 B1 * | 3/2002 | Sprenger et al. | 709/217 |
| 6,597,956 B1 | 7/2003 | Aziz et al. | |
| 7,139,816 B2 * | 11/2006 | Anand et al. | 709/220 |
| 7,475,108 B2 * | 1/2009 | Di Giulio et al. | 709/223 |
| 7,743,126 B2 * | 6/2010 | Russell | 709/223 |
| 2002/0078170 A1 * | 6/2002 | Brewer et al. | 709/218 |
| 2002/0166046 A1 * | 11/2002 | Bidarahalli et al. | 713/2 |
| 2006/0149811 A1 * | 7/2006 | Bennett et al. | 709/203 |

FOREIGN PATENT DOCUMENTS

| | | |
|---|---|---|
| JP | A 4-51937 | 2/1992 |
| JP | 10-240699 | 9/1998 |
| JP | 2000-155695 | 6/2000 |
| JP | 2004-508616 | 3/2004 |

OTHER PUBLICATIONS

"Adaptive Services Control Center ASCC™" Fujitsu Siemens Computers, 2008, fujitsu-siemens.com/products/software/management/quality_of_service/ascc.html, Dec. 6, 2005.
International Search Report for PCT Parent Application No. PCT/JP2005/024073, mailed Apr. 11, 2006.

* cited by examiner

*Primary Examiner* — Bharat N Barot
(74) *Attorney, Agent, or Firm* — Greer, Burns & Crain, Ltd.

(57) ABSTRACT

A resource coordinator manager automatically sets a LAN and a SAN for a server to be add according to an increase in load. An ASCC satellite executes a boot script to boot up a user application on the server. The ASCC satellite executes a stop script to stop a user application executed on a server to be returned to a server pool according to a decrease in load. The resource coordinator manager automatically releases a LAN and a SAN set for the server to be returned.

10 Claims, 35 Drawing Sheets

FIG.5

SITE DATA
300

| SITE NAME | SITE MANAGEMENT SERVER NAME | DOMAIN MANAGEMENT SERVER NAME |
|---|---|---|
| DataCenter | SiteAdminSvrA | DomainAdminSvrA |
| | | DomainAdminSvrB |

FIG.6

DOMAIN MANAGEMENT SERVER DATA
310

| DOMAIN MANAGEMENT SERVER NAME | MANAGEMENT SUBNET NAME |
|---|---|
| DomainAdminSvrA | AdminSubnetA |
| | AdminSubnetB |
| DomainAdminSvrB | AdminSubnetC |

FIG.7

MANAGEMENT SUBNET DATA
320 

| MANAGEMENT SUBNET NAME | NETWORK ADDRESS | NETMASK | DEFAULT GATEWAY |
|---|---|---|---|
| AdminSubnetA | 192.168.1.0 | 255.255.255.0 | 192.168.1.1 |
| AdminSubnetB | 192.168.2.0 | 255.255.255.0 | 192.168.2.1 |
| AdminSubnetC | 192.168.3.0 | 255.255.255.0 | 192.168.3.1 |

FIG.8

MIDDLEWARE COOPERATION IF DATA
330 

| MIDDLEWARE NAME | TARGET EVENT | TIMING | LOCATION | EXECUTION COMMAND |
|---|---|---|---|---|
| MW_A | SERVER GROUP CREATION | BEFORE<br>AFTER | MANAGER<br>MANAGER | –<br>issvgrp add |
| | SERVER GROUP DELETION | BEFORE<br>AFTER | MANAGER<br>MANAGER | issvgrp del<br>– |
| | SERVER ADDITION | BEFORE<br>AFTER | MANAGER<br>MANAGER<br>AGENT | isserver check<br>isserver add<br>– |
| | SERVER DELETION | BEFORE<br>AFTER | MANAGER<br>AGENT<br>MANAGER | isserver del<br>–<br>– |
| | SOFTWARE IMAGE EXTRACTION | BEFORE<br>AFTER | MANAGER<br>AGENT<br>MANAGER<br>AGENT | –<br>isproc stop<br>–<br>isproc start |
| | SOFTWARE IMAGE DISTRIBUTION | BEFORE<br>AFTER | MANAGER<br>MANAGER<br>AGENT | isserver check<br>isserver update<br>isproc start |

FIG.9

SERVER DOMAIN DATA
340

| SERVER DOMAIN NAME | SERVER ARCHITECTURE NAME | MANAGEMENT SUBNET NAME |
|---|---|---|
| Web_domain | ARC_A | AdminSubnetA |
| AP_domain | ARC_B | AdminSubnetB |
| DB_domain | ARC_C | AdminSubnetC |

FIG.10

POOL GROUP DATA
350

| POOL GROUP NAME | TYPE | SERVER DOMAIN NAME |
|---|---|---|
| Web_domain.pool | SERVER GROUP SHARING | Web_domain |
| AP_domain.pool | SERVER GROUP SHARING | AP_domain |
| DB_domain.pool | SERVER GROUP SHARING | DB_domain |
| A_DB.pool | SERVER GROUP ONLY | |
| B_DB.pool | SERVER GROUP ONLY | |

FIG.11

STORAGE DOMAIN DATA
360

| STORAGE DOMAIN NAME | REDUNDANCY OF PATH |
|---|---|
| Web_AP_DISK_domain | 2 |
| DB_DISK_domain | 4 |

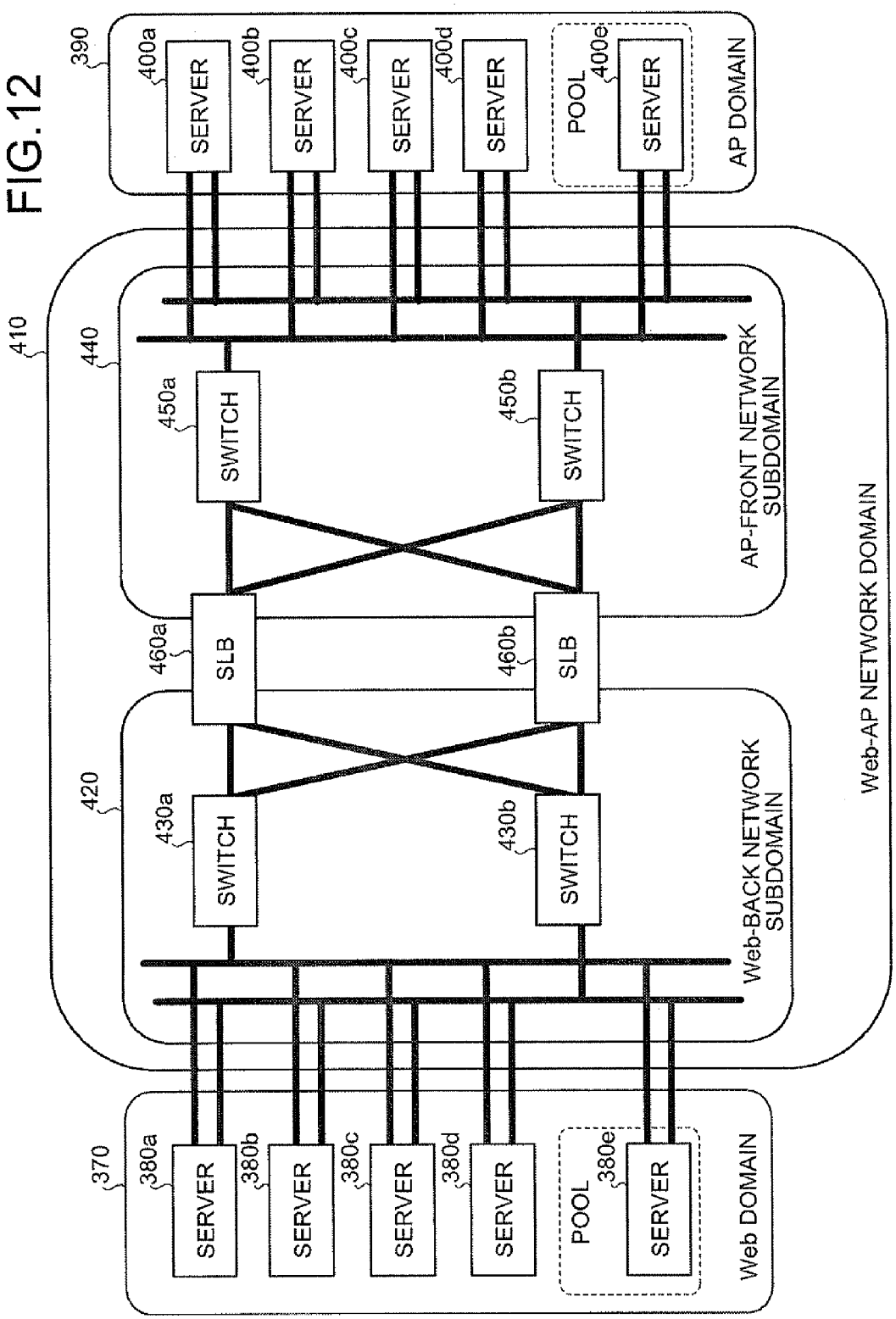

FIG.13

NETWORK SUBDOMAIN DATA
470

| NETWORK SUBDOMAIN NAME | SWITCH MODEL | SWITCH MANAGEMENT IP |
|---|---|---|
| Web-Front | SW1234 | 192.168.1.2 |
|  | SW1234 | 192.168.1.3 |
| Web-Back | SW1234 | 192.168.1.2 |
|  | SW1234 | 192.168.1.3 |
| AP-Front | SW1234 | 192.168.2.4 |
|  | SW1234 | 192.168.2.5 |
| AP-Back | SW1234 | 192.168.2.2 |
|  | SW1234 | 192.168.2.3 |
| DB-Front | SW1234 | 192.168.3.4 |
|  | SW1234 | 192.168.3.5 |

FIG.14

NETWORK DOMAIN DATA
480

| NETWORK DOMAIN NAME | NETWORK SUBDOMAIN NAME | CONNECTION SYSTEM | DEVICE NAME | BACK NETWORK SUBDOMAIN NAME | REDUNDANCY SYSTEM |
|---|---|---|---|---|---|
| Internet-Edge | *Internet* | LOAD BALANCER | WEB_LB | Web-Front | NIC SWITCH |
| Web-AP | Web-Back | LOAD BALANCER | AP_LB | AP-Front | HIGH-SPEED SWITCH |
| AP-DB | AP-Back | Firewall | DB_FW | DB-Front | NIC SWITCH |

FIG.15

LOAD DISTRIBUTING APPARATUS DATA
490

| LOAD DISTRIBUTING APPARATUS NAME | MANAGEMENT IP | MODEL NAME | SNMP COMMUNITY NAME | ID/PASSWORD |
|---|---|---|---|---|
| Web_LB | 192.168.1.1 | LB_A | public | admin/admin |
| AP_LB | 192.168.2.1 | LB_A | public | admin/admin |

FIG.17

NETWORK SUB-GROUP DATA
660

| NETWORK SUB-GROUP NAME | NETWORK SUBDOMAIN NAME | SUBNET | SUBNET FOR REDUNCANCY |
|---|---|---|---|
| A_Web-Front | Web-Front | 10.1.1.0/255.255.255.0 | — |
| B_Web-Front | Web-Front | 10.1.2.0/255.255.255.0 | — |
| A_Web-Back | Web-Back | 10.1.3.0/255.255.255.0 | 10.1.11.0/255.255.255.0 |
| | | | 10.1.12.0/255.255.255.0 |
| B_Web-Back | Web-Back | 10.1.4.0/255.255.255.0 | 10.1.13.0/255.255.255.0 |
| | | | 10.1.14.0/255.255.255.0 |
| A_AP-Front | AP-Front | 10.1.5.0/255.255.255.0 | 10.1.15.0/255.255.255.0 |
| | | | 10.1.16.0/255.255.255.0 |
| B_AP-Front | AP-Front | 10.1.6.0/255.255.255.0 | 10.1.17.0/255.255.255.0 |
| | | | 10.1.18.0/255.255.255.0 |
| A_AP-Back | AP-Back | 10.1.7.0/255.255.255.0 | — |
| B_AP-Back | AP-Back | 10.1.8.0/255.255.255.0 | — |
| A_DB-Front | DB-Front | 10.1.9.0/255.255.255.0 | — |
| B_DB-Front | DB-Front | 10.1.10.0/255.255.255.0 | — |

FIG.18

INTER-SERVER-DOMAIN LINK DATA
670

| FRONT SERVER DOMAIN NAME | NETWORK DOMAIN NAME | BACK SERVER DOMAIN NAME |
|---|---|---|
| *Internet* | Internet-Edge | Web_domain |
| Web_domain | Web-AP | AP_domain |
| AP_domain | AP-DB | DB_domain |

INTER-SERVER/STORAGE-DOMAIN LINK DATA
680

| SERVER DOMAIN NAME | STORAGE DOMAIN NAME |
|---|---|
| Web_domain | Web_AP_DISK_domain |
| AP_domain | |
| DB_domain | DB_DISK_domain |

NETWORK BOOT SERVER DATA
690

| MAC ADDRESS | IP ADDRESS | HOST NAME |
|---|---|---|
| 00:00:E2:6F:55:01 | 192.168.1.2 | host1 |
| UNASSIGNED (AUTO) | 192.168.1.3 | host2 |
| UNASSIGNED (AUTO) | 192.168.1.4 | host3 |

FIG.21

MANAGEMENT TARGET SERVER DATA
700

| SERVER NAME | IP ADDRESS | MAC ADDRESS | SERVER ARCHITECTURE NAME | MODEL NAME | SAN BOOT | STATUS |
|---|---|---|---|---|---|---|
| host1 | 192.168.1.2 | 00:00:E2:6E:55:01 | ARC_A | MODEL_A | O | NORMAL |
| host2 | 192.168.1.3 | 00:00:E2:6E:55:02 | ARC_A | MODEL_A | O | NORMAL |
| host3 | 192.168.1.4 | 00:00:E2:6E:55:03 | ARC_A | MODEL_A | O | NORMAL |
| host4 | 192.168.1.5 | 00:00:E2:6E:55:04 | ARC_A | MODEL_A | O | NORMAL |
| host5 | 192.168.1.6 | 00:00:E2:6E:55:05 | ARC_A | MODEL_A | O | NORMAL |
| host6 | 192.168.2.2 | 00:00:E2:6E:55:06 | ARC_B | MODEL_B | O | NORMAL |
| host7 | 192.168.2.3 | 00:00:E2:6E:55:07 | ARC_B | MODEL_B | O | NORMAL |
| host8 | 192.168.2.4 | 00:00:E2:6E:55:08 | ARC_B | MODEL_B | O | NORMAL |
| host9 | 192.168.2.5 | 00:00:E2:6E:55:09 | ARC_B | MODEL_B | O | NORMAL |
| host10 | 192.168.2.6 | 00:00:E2:6E:55:0A | ARC_B | MODEL_B | O | NORMAL |
| host11 | 192.168.3.2 | 00:00:E2:6E:55:0B | ARC_C | MODEL_C | O | NORMAL |
| host12 | 192.168.3.3 | 00:00:E2:6E:55:0C | ARC_C | MODEL_C | O | NORMAL |
| host13 | 192.168.3.4 | 00:00:E2:6E:55:0D | ARC_C | MODEL_C | O | NORMAL |
| host14 | 192.168.3.5 | 00:00:E2:6E:55:0E | ARC_C | MODEL_C | O | NORMAL |
| host15 | 192.168.3.6 | 00:00:E2:6E:55:0F | ARC_C | MODEL_C | O | NORMAL |

FIG.25

STORAGE TEMPLATE DATA
800

| STORAGE TEMPLATE NAME | DISK TYPE | DISK NAME | RELIABILITY NEED | LOAD LEVEL | DISK CAPACITY | BOOT DISK |
|---|---|---|---|---|---|---|
| A_Web_Str_template | ROOT | disk1 | HIGH | NORMAL | 50GB | ○ |
|  | LOCAL | disk2 | HIGH | NORMAL | 100GB | × |
|  |  | disk3 | HIGH | HIGH | 200GB | × |
| B_Web_Str_template | ROOT | disk1 | HIGH | NORMAL | 50GB | ○ |
|  | LOCAL | disk2 | HIGH | NORMAL | 50GB | × |
|  |  | disk3 | HIGH | HIGH | 100GB | × |
| A_AP_Str_template | ROOT | disk1 | HIGH | NORMAL | 200GB | ○ |
|  | LOCAL | disk2 | HIGH | HIGH | 200GB | × |
| B_AP_Str_template | ROOT | disk1 | HIGH | NORMAL | 100GB | ○ |
|  | LOCAL | disk2 | HIGH | HIGH | 100GB | × |
| A_DB_Str_template | ROOT | disk1 | HIGH | NORMAL | 100GB | ○ |
|  | LOCAL | disk2 | HIGH | HIGH | 100GB | × |
|  | SHARED | disk3 | HIGH | HIGH | 500GB | × |
| B_DB_Str_template | ROOT | disk1 | HIGH | NORMAL | 100GB | ○ |
|  | LOCAL | disk2 | HIGH | HIGH | 100GB | × |
|  | SHARED | disk3 | HIGH | HIGH | 250GB | × |
| A_Batch_Str_template | ROOT | disk1 | HIGH | NORMAL | 200GB | ○ |

FIG.26

SERVER GROUP DATA
810

| SERVER GROUP NAME | SERVER DOMAIN NAME | SOFTWARE DISTRIBUTION IMAGE NAME | VERSION | STORAGE TEMPLATE NAME | SAN BOOT | AUTO RECOVERY |
|---|---|---|---|---|---|---|
| A_Web | Web_domain | A_OS_Web_image | 1.0 | A_Web_Str_template | ○ | × |
| B_Web | Web_domain | B_OS_Web_image | 1.1 | B_Web_Str_template | ○ | × |
| A_AP | AP_domain | A_OS_AP_image | 1.3 | A_AP_Str_template | ○ | ○ |
| B_AP | AP_domain | B_OS_AP_image | 1.6 | B_AP_Str_template | ○ | ○ |
| A_DB | DB_domain | C_OS_DB_A_image | 1.0 | A_DB_Str_template | ○ | × |
| B_DB | DB_domain | C_OS_DB_B_image | 1.0 | B_DB_Str_template | ○ | × |
| A_Batch | DB_domain | C_OS_Batch_image | 1.1 | A_Batch_Str_template | ○ | × |

FIG.27

SERVER/STORAGE GROUP LINK DATA
820

| SERVER GROUP NAME | STORAGE GROUP NAME | STORAGE DOMAIN NAME |
|---|---|---|
| A_Web | A_Web_rootdisk | Web_AP_DISK_domain |
| A_Web | A_Web_localdisk | Web_AP_DISK_domain |
| B_Web | B_Web_rootdisk | Web_AP_DISK_domain |
| B_Web | B_Web_localdisk | Web_AP_DISK_domain |
| A_AP | A_AP_rootdisk | Web_AP_DISK_domain |
| A_AP | A_AP_localdisk | Web_AP_DISK_domain |
| B_AP | B_AP_rootdisk | Web_AP_DISK_domain |
| B_AP | B_AP_localdisk | Web_AP_DISK_domain |
| A_DB | A_DB_rootdisk | DB_DISK_domain |
| A_DB | A_DB_localdisk | DB_DISK_domain |
| A_DB | A_DB_shareddisk | DB_DISK_domain |
| B_DB | B_DB_rootdisk | DB_DISK_domain |
| B_DB | B_DB_localdisk | DB_DISK_domain |
| B_DB | B_DB_shareddisk | DB_DISK_domain |
| A_Batch | A_Batch_rootdisk | |

FIG.28

INTER-SERVER-GROUP LINK DATA
830

| FRONT SERVER GROUP NAME | NETWORK GROUP NAME | BACK SERVER GROUP NAME |
|---|---|---|
| *Internet* | A_Internet-Edge | A_Web |
| *Internet* | B_Internet-Edge | B_Web |
| A_Web | A_Web-AP | A_AP |
| B_Web | B_Web-AP | B_AP |
| A_AP | A_AP-DB | A_DB |
| B_AP | B_AP-DB | B_DB |

FIG.29

LOAD DISTRIBUTION GROUP DATA
840 

| LOAD DISTRIBUTION GROUP NAME | LOAD BALANCER NAME | REPRE-SENTATIVE IP |
|---|---|---|
| A_Web_LB | Web_LB | 10.0.1.1 |
| B_Web_LB | Web_LB | 10.0.1.2 |
| A_AP_LB | AP_LB | 10.1.3.1 |
| B_AP_LB | AP_LB | 10.1.4.1 |

FIG.30

NETWORK GROUP DATA
850 

| NETWORK GROUP NAME | NETWORK DOMAIN NAME | FRONT NETWORK SUB-GROUP NAME | LOAD DISTRIBUTION GROUP NAME | BACK NETWORK SUB-GROUP NAME |
|---|---|---|---|---|
| A_Internet-Edge | Internet-Edge | *Internet* | A_Web_LB | A_Web-Front |
| B_Internet-Edge | Internet-Edge | *Internet* | B_Web_LB | B_Web-Front |
| A_Web-AP | Web-AP | A_Web-Back | A_AP_LB | A_AP-Front |
| B_Web-AP | Web-AP | B_Web-Back | B_AP_LB | B_AP-Front |
| A_AP-DB | AP-DB | A_AP-Back | — | A_DB-Front |
| B_AP-DB | AP-DB | B_AP-Back | — | B_DB-Front |

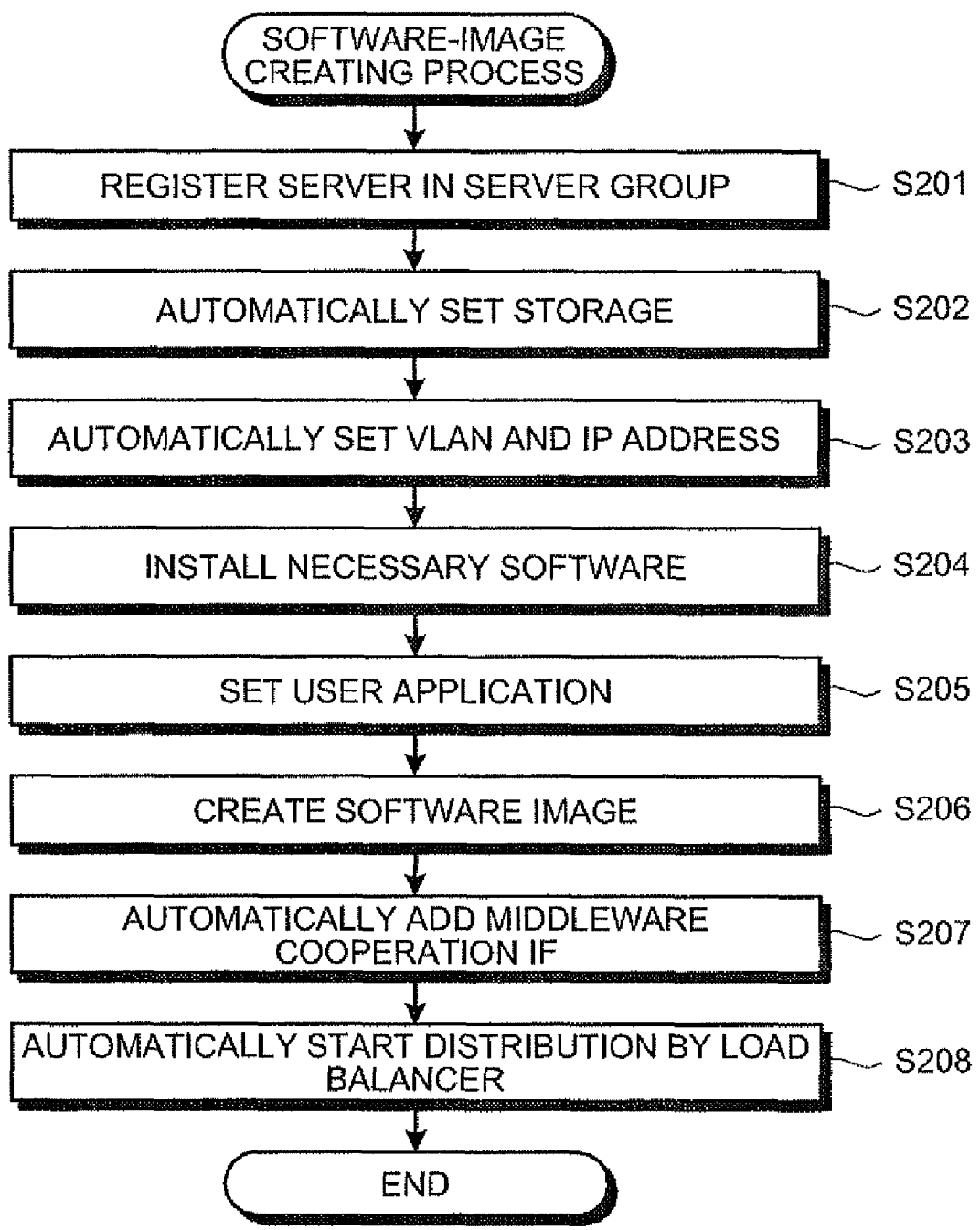

FIG.32

PROVISIONING CONFIGURATION DATA
960

| SERVER NAME | POOL GROUP NAME | SERVER GROUP NAME | STORAGE SUB-GROUP NAME | ACCESS-IBILITY |
|---|---|---|---|---|
| host1 | - | A_Web | A_Web_rootdisk_host1 | ○ |
| | | | A_Web_localdisk_host1 | ○ |
| host2 | - | A_Web | A_Web_rootdisk_host2 | ○ |
| | | | A_Web_localdisk_host2 | ○ |
| host3 | - | B_Web | B_Web_rootdisk_host3 | ○ |
| | | | A_Web_localdisk_host3 | ○ |
| host4 | - | B_Web | B_Web_rootdisk_host4 | ○ |
| | | | A_Web_localdisk_host4 | ○ |
| host5 | Web_domain.pool | - | A_Web_rootdisk_host5 | × |
| | | | A_Web_localdisk_host5 | × |
| | | | B_Web_rootdisk_host5 | × |
| | | | B_Web_localdisk_host5 | × |
| host6 | - | A_AP | A_AP_rootdisk_host6 | ○ |
| | | | A_AP_localdisk_host6 | ○ |
| host7 | - | A_AP | A_AP_rootdisk_host7 | ○ |
| | | | A_AP_localdisk_host7 | ○ |
| host8 | - | B_AP | B_AP_rootdisk_host8 | ○ |
| | | | B_AP_localdisk_host8 | ○ |
| host9 | - | B_AP | B_AP_rootdisk_host9 | ○ |
| | | | B_AP_localdisk_host9 | ○ |
| host10 | AP_domain.pool | - | - | - |
| host11 | - | A_DB | A_DB_rootdisk_host11 | ○ |
| | | | A_DB_localdisk_host11 | ○ |
| | | | A_Batch_rootdisk_host11 | × |
| host12 | - | A_DB | A_DB_rootdisk_host12 | ○ |
| | | | A_DB_localdisk_host12 | ○ |
| | | | A_Batch_rootdisk_host12 | × |
| host13 | - | B_DB | B_DB_rootdisk_host13 | ○ |
| | | | B_DB_localdisk_host13 | ○ |
| host14 | - | B_DB | B_DB_rootdisk_host14 | ○ |
| | | | B_DB_localdisk_host14 | ○ |
| host15 | B_DB_domain.pool | - | - | - |

IP ADDRESS MANAGEMENT DATA
1040

| IP ADDRESS | ASSIGNMENT DESTINATION |
|---|---|
| 10.1.1.1 | host1 |
| 10.1.1.2 | host2 |
| 10.1.1.3-250 | FOR AUTO REGISTRATION |
| 10.1.1.251-254 | DEVICE OUT OF MANAGEMENT |

FIG. 35

SOFTWARE IMAGE MANAGEMENT DATA
1050

| SOFTWARE IMAGE NAME | FORMAT | OS PROPERTY | SOFTWARE NAME |
|---|---|---|---|
| A_OS | ARCHIVE FORMAT | y | A_OS RHAS 3.0 |
| B_OS Server | ARCHIVE FORMAT | y | B_OS Server |
| C_OS 8 | ARCHIVE FORMAT | y | C_OS 8 |
| C_OS 9 | ARCHIVE FORMAT | y | C_OS 9 |
| A_Software_L | ARCHIVE FORMAT | n | A_Software for A_OS |
| A_Software_W | ARCHIVE FORMAT | n | A_Software for B_OS |
| MW_A_L | ARCHIVE FORMAT | n | MW_A V7 for A_OS |
| MW_A_W | ARCHIVE FORMAT | n | MW_A V7 for B_OS |
| B_Software | ARCHIVE FORMAT | n | B_Software |
| patch_a | PATCH FORMAT | n | T912345LP-01 |

FIG. 36

SOFTWARE DISTRIBUTION IMAGE MANAGEMENT DATA
1060

| SOFTWARE DISTRIBUTION IMAGE NAME | VERSION | SERVER ARCHITECTURE NAME | SOFTWARE IMAGE/ SNAPSHOT NAME |
|---|---|---|---|
| A_OS_Web_image | 1.0 | ARC_A<br>ARC_B | apimg_snap_1 |
| B_OS_Web_image | 1.1 | ARC_A | B_OS Server<br>A_Software_W |
| A_OS_AP_image | 1.2 | ARC_A<br>ARC_B | A_OS<br>MW_A_L |
| A_OS_AP_image | 1.3 | ARC_A<br>ARC_B | A_OS<br>MW_A_L<br>patch_a |
| B_OS_AP_image | 1.6 | ARC_A | B_OS Server<br>MW_A_W |
| C_OS_DB_A_image | 1.0 | ARC_C | C_OS 9<br>A_Software |
| C_OS_DB_B_image | 1.0 | ARC_C | C_OS 8<br>B_Software |
| C_OS_Batch_image | 1.1 | ARC_C | C_OS 9 |

SNAPSHOT MANAGEMENT DATA
1070

SERVICE LOAD DATA
1075

| DOMAIN | SERVICE | PERFORMANCE | | | PRIORITY | NUMBER OF SERVERS | | |
|---|---|---|---|---|---|---|---|---|
| | | min | max | PRESENT STATE | | MINI-MUM | MAXI-MUM | PRESENT STATE |
| WebDomain | WebA1 | 30% | 80% | 50% | 1 | 2 | 4 | 2 |
| | WebA2 | 20% | 90% | 70% | 2 | 1 | 3 | 1 |
| | WebB1 | MANUAL | MANUAL | - | MANUAL | MANUAL | MANUAL | 1 |
| | WebB2 | 10% | 70% | 50% | MANUAL | 1 | 3 | 1 |

FIG.42

DISTRIBUTION MANAGEMENT DATA
1080

| SERVER NAME | STORAGE SUB-GROUP NAME | SOFTWARE DISTRIBUTION IMAGE NAME | VERSION | STATUS |
|---|---|---|---|---|
| host1 | A_Web_rootdisk_host1 | A_OS_Web_image | 1.0 | COMPLETE |
| host2 | A_Web_rootdisk_host2 | A_OS_Web_image | 1.0 | DISTRIBUTING |
| host3 | B_Web_rootdisk_host3 | B_OS_Web_image | 1.1 | FAILED |
| host4 | B_Web_rootdisk_host4 | B_OS_Web_image | 1.1 | COMPLETE |
| host5 | A_Web_rootdisk_host5 | A_OS_Web_image | 1.0 | COMPLETE |
|  | B_Web_rootdisk_host5 | B_OS_Web_image | 1.1 | COMPLETE |
| host6 | A_AP_rootdisk_host6 | A_OS_AP_image | 1.3 | COMPLETE |
| host7 | A_AP_rootdisk_host7 | A_OS_AP_image | 1.3 | COMPLETE |
| host8 | B_AP_rootdisk_host8 | B_OS_AP_image | 1.6 | COMPLETE |
| host9 | B_AP_rootdisk_host9 | B_OS_AP_image | 1.6 | COMPLETE |
| host10 | - | - | - | - |
| host11 | A_DB_rootdisk_host11 | C_OS_DB_A_image | 1.0 | COMPLETE |
|  | A_Batch_rootdisk_host11 | C_OS_Batch_image | 1.1 | COMPLETE |
| host12 | A_DB_rootdisk_host12 | C_OS_DB_A_image | 1.0 | COMPLETE |
|  | A_Batch_rootdisk_host12 | C_OS_Batch_image | 1.1 | COMPLETE |
| host13 | B_DB_rootdisk_host13 | C_OS_DB_B_image | 1.0 | COMPLETE |
| host14 | B_DB_rootdisk_host14 | C_OS_DB_B_image | 1.0 | COMPLETE |
| host15 | - | - | - | - |

OPERATION SERVER DATA
1090

| SERVICE | SERVER GROUP | SERVER IN OPERATION |
|---|---|---|
| WebA1 | WebA | host1, host2 |
| WebA2 | WebA | host1 |
| WebB1 | WebB | host3 |
| WebB2 | WebB | host4 |
|  | POOL | host5 |

COMPUTER PRODUCT, METHOD, AND APPARATUS FOR MANAGING OPERATIONS OF SERVERS

This application is a Continuation of International Application Serial No. PCT/JP2005/024073, filed Dec. 28, 2005.

BACKGROUND OF THE INVENTION

1. Field of the Invention

The present invention relates to a technology for managing a plurality of servers that execute the same user applications to provide a service.

2. Description of the Related Art

Software, Adaptive Service Control Center (ASCC), (registered trademark) has been developed for autonomously adjusting a performance of an information processing system according to service load. Reference may be had to, for example, "Adaptive Services Control Center ASCC", [retrieved on Dec. 6, 2005], Internet <URL: http://www.fujitsu-siemens.com/products/software/management/quality_of_service/ascc.html>). The ASCC automatically increases or decreases, according to service load, the number of servers that execute user applications for providing the service to thereby maintain the service level even when the load increases.

However, the ASCC cannot set logical resources necessary for user applications to provide a service, which limits the applicability of the user applications. In other words, because the ASCC is not capable of setting of a network and a storage and release of the setting upon adding or reducing a server, there is a limit in user applications that can be applied to provide a service.

SUMMARY

It is an object of the present invention to at least partially solve the problems in the conventional technology.

According to an aspect of the present invention, there is provided an operation management method for managing a plurality of servers each executing an identical user application to provide a service as a whole. The operation management method includes setting, for addition of a server to execute the user application, a logical resource necessary for executing the user application in the server to be added; and booting, upon addition of the server, the user application on the server.

According to another aspect of the present invention, there is provided an operation management apparatus that manages a plurality of servers each executing an identical user application to provide a service as a whole. The operation management apparatus includes a setting unit that sets, for addition of a server to execute the user application, a logical resource necessary for executing the user application in the server to be added; and a booting unit that boots, upon addition of the server, the user application on the server.

According to still another aspect of the present invention, there is provided a computer program product that implements the above method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an example of site data in which information on an operation management server is registered;

FIG. 6 is an example of domain management server data in which information on a domain management server is registered;

FIG. 7 is an example of management sub-network data in which information on sub-networks to be managed is registered;

FIG. 8 is an example of middleware cooperation IF data containing commands for performing various processes in cooperation with middleware;

FIG. 9 is an example of server domain data containing information on server domains as domains to which servers belong;

FIG. 10 is an example of pool group data containing information on pool groups;

FIG. 11 is an example of storage domain data containing information on storage domains;

FIG. 12 is a schematic diagram for explaining network domains and network subdomains;

FIG. 13 is an example of network subdomain data containing information on network subdomains;

FIG. 14 is an example of network domain data containing information on network domains;

FIG. 15 is an example of load distributing apparatus data containing information on load distributing apparatuses;

FIG. 17 is an example of network sub-group data containing information on network sub-groups;

FIG. 18 is an example of inter-server-domain link data containing information on a correspondence relation among server domains;

FIG. 21 is an example of management target server data containing information on servers to be managed;

FIG. 25 is an example of storage template data containing information on storage templates;

FIG. 26 is an example of server group data containing information on server groups;

FIG. 27 is an example of server/storage group link data containing information on storage groups corresponding to server groups;

FIG. 28 is an example of inter-server-group link data containing information on a correspondence relation among server groups;

FIG. 29 is an example of load distribution group data containing group information of load distributing apparatuses;

FIG. 30 is an example of network group data containing information on network groups;

FIG. 31 is a detailed flowchart of software-image creation processing shown in FIG. 4;

FIG. 32 is an example of provisioning configuration data in which storage sub-groups are set;

FIG. 35 is an example of software image management data containing information on software images;

FIG. 36 is an example of software distribution image management data containing information on software distribution images;

FIG. 42 is an example of distribution management data containing information on distribution state of software distribution images;

DETAILED DESCRIPTION OF THE PREFERRED EMBODIMENTS

Exemplary embodiments of the present invention are explained in detail below with reference to the accompanying drawings.

Figure 1:
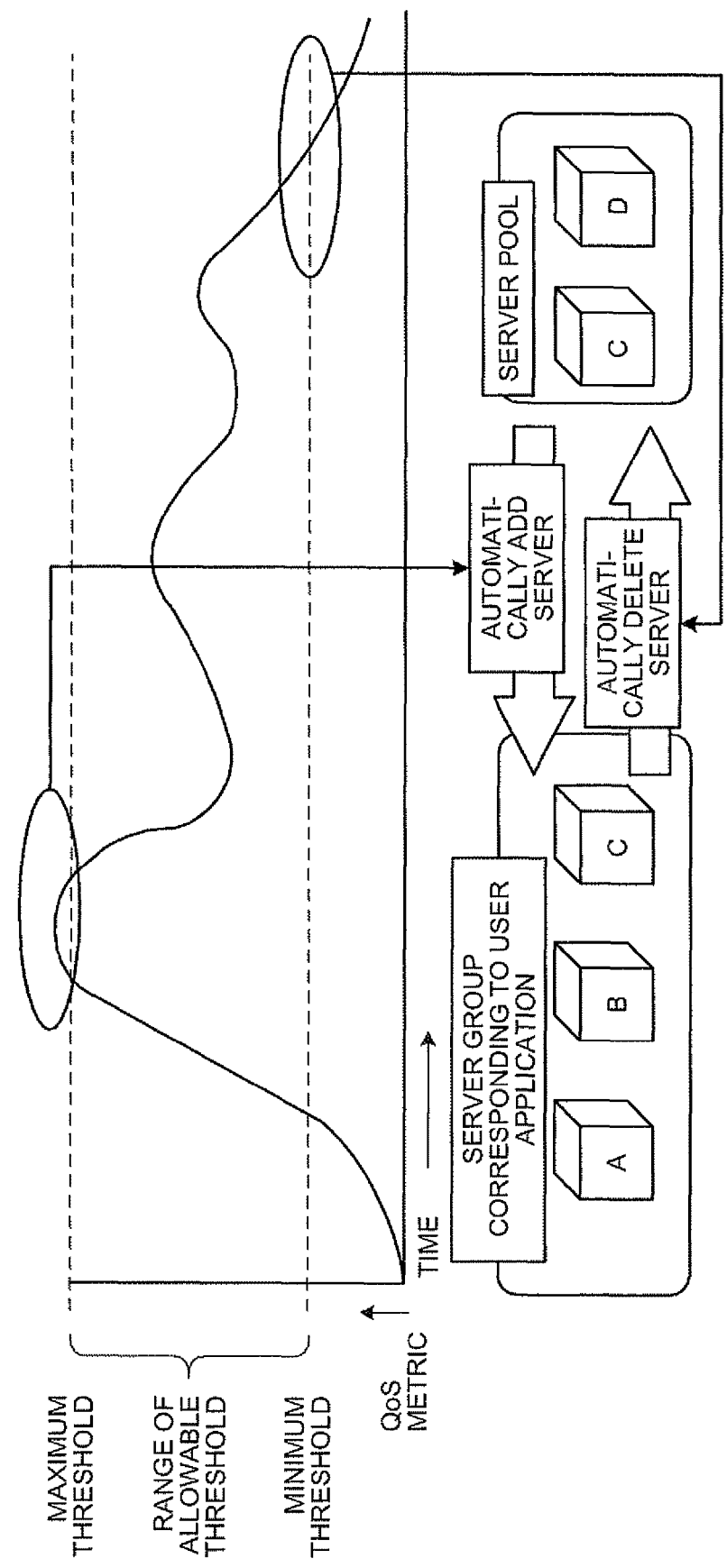
FIG. 1 is a schematic diagram for explaining a concept of application provisioning.

FIG. 1 is a schematic diagram for explaining a concept of application provisioning according to an embodiment of the present invention. As shown in FIG. 1, the application provisioning refers to automatically adjusting the number of servers according to a load of a task.

In other words, the application provisioning refers to providing a maximum threshold and a minimum threshold for a QoS metric corresponding to a load of a task, when a value of the QoS metric exceeds the maximum threshold, automatically increasing the number of servers assigned to an application for carrying out the task, and, when a value of the QoS metric falls below the minimum threshold, automatically decreasing the number of servers assigned to a user application for carrying out the task.

In the conventional ASCC, simple addition or deletion of a server is also performed correspondingly to change in load. However, in the application provisioning according to this embodiment, setting of logical resources necessary for the user application and release of the setting are automatically performed.

Consequently, even for a user application that requires a network and a storage, it is possible to automatically adjust the number of servers according to a load of a task.

Figure 2:
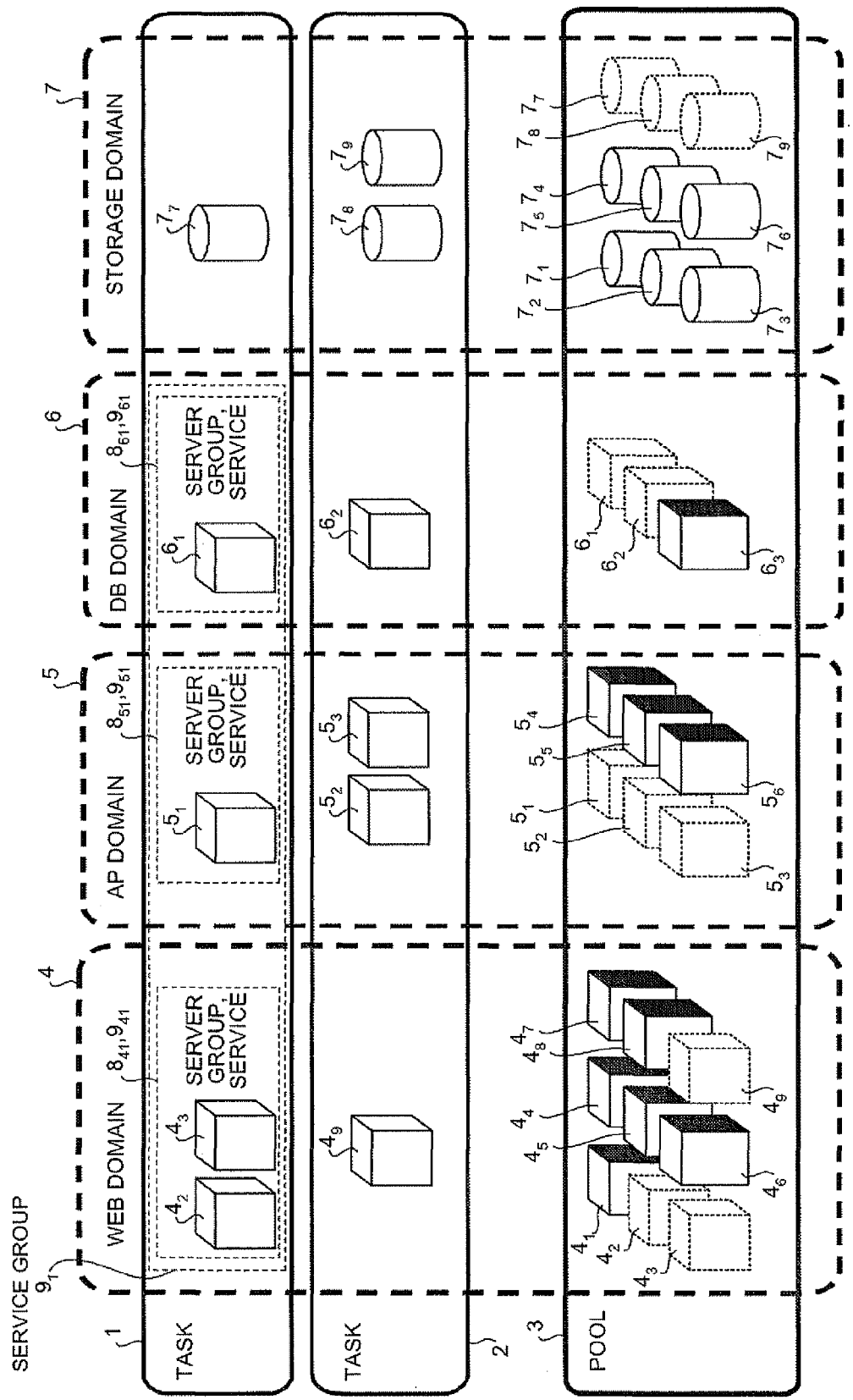
FIG. 2 is a schematic diagram for explaining concepts of a domain and a service according to an embodiment of the present invention.

FIG. 2 is a schematic diagram for explaining concepts of a domain and a service according to the embodiment.

In FIG. 2, information processing apparatuses such as web servers $4_1$ to $4_9$, application (AP) servers $5_1$ to $5_6$, database (DB) servers $6_1$ to $6_3$, and storages $7_1$ to $7_9$ are used for each of tasks 1 and 2.

The web servers $4_1$ to $4_9$ provide contents to be browsed by web browsers to client terminals via the Internet. The AP servers $5_1$ to $5_6$ take over execution of information processes requested by the web servers $4_1$ to $4_9$ that have received an information processing request from a user.

The DB servers $6_1$ to $6_3$ manage accesses to database upon receiving requests for accessing the database from the AP servers $5_1$ to $5_6$. The storages $7_1$ to $7_9$ are storage devices to be connected via a SAN to the web servers $4_1$ to $4_9$, the AP servers $5_1$ to $5_6$, and the DB servers $6_1$ to $6_3$.

With operation management according to this embodiment, a resource group that contains servers or storages having a uniform physical wire connection to other devices is managed as a domain in a local area network (LAN) or a storage area network (SAN).

In the example of FIG. 2, server groups used for the tasks 1 and 2 are managed as a web domain 4, an AP domain 5, and a DB domain 6, while a storage group used for the tasks 1 and 2 is managed as a storage domain 7.

In this case, the web servers $4_1$ to $4_9$ that belong to the web domain 4 have uniform connections to other devices, the AP servers $5_1$ to $5_6$ that belong to the AP domain 5 have uniform connections to other devices, the DB servers $6_1$ to $6_3$ that belong to the DB domain 6 have uniform connections to other devices, and the storages $7_1$ to $7_9$ that belong to the storage domain 7 have uniform connections to other devices.

On the other hand, wire connection states to the other apparatuses are different and security levels are also different among the domains. For example, the Web domain 4 is a domain near an external network. Therefore, compared with the AP domain 5, a security level of the Web domain 4 is often low.

With the operation management, unused ones of the web servers $4_1$ to $4_9$, the AP servers $5_1$ to $5_6$, the DB servers $6_1$ to $6_3$, and the storages $7_1$ to $7_9$ are registered to a pool 3 for each domain. The web servers $4_1$ to $4_9$, the AP servers $5_1$ to $5_6$, the DB servers $6_1$ to $6_3$, and the storages $7_1$ to $7_9$ are assigned to each of the tasks 1 and 2 as appropriate.

In the example of FIG. 2, the web servers $4_2$ and $4_3$, the AP server $5_1$, the DB server $6_1$, and the storage $7_7$ are assigned to the task 1, while the web server $4_9$, the AP servers $5_2$ and $5_3$, the DB server $6_2$, and the storages $7_8$ and $7_9$ are assigned to the task 2.

The servers assigned to the specific tasks in the respective domains constitute server groups in the respective domains. Services provided by the respective domains to perform specific tasks correspond to the respective server groups. The service groups are formed by collecting services of the same task from the respective domains. As a result, servers of server groups that provide respective services belong to the service groups.

For example, the Web servers $4_2$ and $4_3$ assigned to the task 1 form a server group $8_{41}$ and the server group $8_{41}$ provides a service 941. The AP server $5_1$ assigned to the task 1 forms a server group $8_{51}$ in the AP domain 5 and the server group $8_{51}$ provides a service $9_{51}$. The DB server $6_1$ assigned to the task 1 forms a server group $8_{61}$ in the DB domain 6 and the server group $8_{61}$ provides a service $9_{61}$. The services $9_{41}$, $9_{51}$, and $9_{61}$ form a service group $9_1$. As a result, the Web servers $4_2$ and $4_3$, the AP server $5_1$, and the DB server $6_1$ belong to the service group $9_1$.

Figure 3:
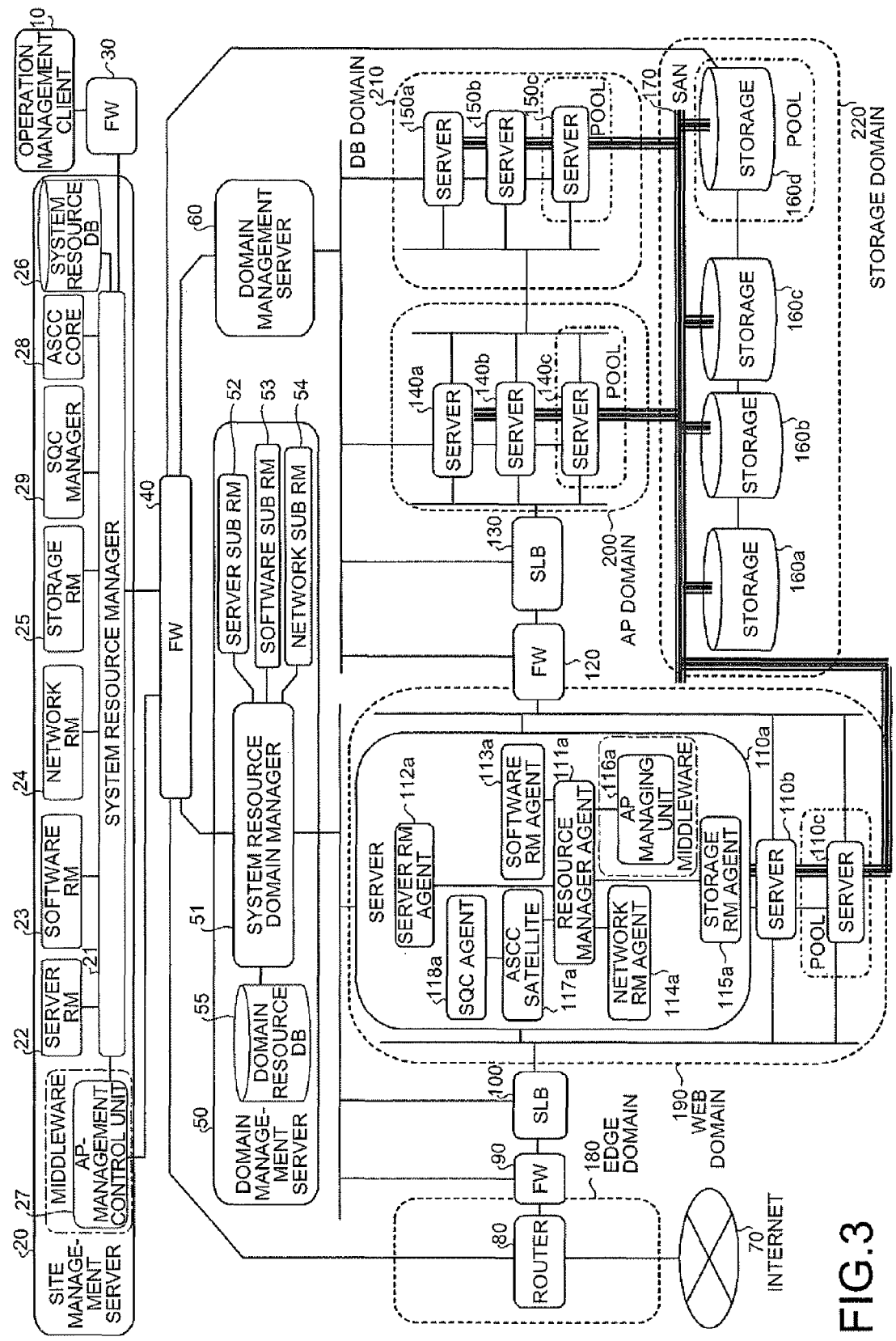
FIG. 3 is a schematic diagram of an operation management system according to the embodiment.

FIG. 3 is a schematic diagram of an operation management system according to the embodiment.

As shown in FIG. 3, in the operation management system, an operation management client 10 is connected to a site management server 20 via a firewall (FW) 30 over a network. The site management server 20 is connected over the network to domain management servers 50 and 60 via an FW 40.

The site management server 20 is connected over the network to a router 80 that belongs to an edge domain 180 via the FW 40. The site management server 20 is also connected over the network to storages 160a to 160c that belong to a storage domain 220, and to a storage 160d that is pooled via the FW 40.

The domain management server 50 is connected over the network to a server load balancer (SLB) 100 and to servers 110a to 110c that belong to a web domain 190.

The domain management server 60 is connected over the network to an FW 120, an SLB 130, servers 140a to 140c that belong to an AP domain 200, servers 150a to 150c that belong to a DB domain 210.

The storages 160a to 160c that belong to the storage domain 220, and the storage 160d that is pooled are also connected via a SAN 170 to the servers 110a to 110c that belong to the web domain 190, the servers 140a to 140c that belong to the AP domain 200, and the servers 150a to 150c that belong to the DB domain 210.

The operation management client 10 receives various settings concerning resource operation management processing from the user, transmits the setting information to the site management server 20 and receives various output results from the site management server 20, and displays the output results on a monitor and the like.

The site management server 20 performs the operation management explained with reference to FIG. 2 in cooperation with the domain management servers 50 and 60. The site management server 20 has functional units, namely, a system resource manager 21, a server resource manager (RM) 22, a software RM 23, a network RM 24, a storage RM 25, a system resource DB 26, an AP-management control unit 27, an ASCC core 28, and an SQC manager 29.

The system resource manager 21 receives various setting information related to the resource operation management processing from the operation management client 10, and operates resources in cooperation with the server RM 22, the software RM 23, the network RM 24, and the storage RM 25. In addition, the system resource manager 21 transmits and receives data between the domain management servers 50 and 60.

The server RM 22 performs boot and stop, collection of information on hardware, setting, and the like for of the servers 110a to 110c, 140a to 140c, and 150a to 150c. The server RM 22 performs the above processing in cooperation with a server sub RM 52 of the domain management server 50 and a server RM agent 112a of the server 110a.

The software RM 23 performs installation of software, setting, collection of information on the software, and the like for the servers 110a to 110c, 140a to 140c, and 150a to 150c.

The software RM 23 performs the above processing in cooperation with a software sub RM 53 of the domain management server 50 and a software RM agent 113a of the server 110a.

The network RM 24 performs information collection, setting, and the like related to the network. The network RM 24 performs the above processes in cooperation with a network sub RM 54 of the domain management server 50, and a network RM agent 114a of the server 110a.

The storage RM 25 performs information collection, setting, and the like related to the storages 160a to 160c that belong to the storage domain 220, and relate to the storage 160d that is pooled. The storage RM 25 manages the storages 160a to 160c and the storage 160d pooled without involving the domain management servers 50 and 60.

The system resource DB 26 stores therein various resource information managed by the system resource manager 21, the server RM 22, the software RM 23, the network RM 24, and the storage RM 25. Details of stored data are explained later.

The AP-management control unit 27 controls and manages an AP managing unit 116a. More specifically, the AP-management control unit 27 sends a request for executing process related to an application such as installation and setting to the AP managing unit 116a. Functions of the AP-management control unit 27 are realized by executing middleware installed on the site management server 20.

The ASCC core 28 adds or deletes a server according to change in service load in cooperation with an ASCC satellite 117a and the SQC manager 29. The ASCC core 28 adds and deletes a server at a user application level.

The addition and deletion of a server at the user application level refers to simply adding and deleting a server according to boot and stop of the user application without performing time-consuming processing such as installation of software necessary for provision of a service. It is possible to quickly cope with change in service load by adding or deleting a server according to boot or stop of the user application in this way.

The ASCC core 28 automatically sets a network and a storage used by the user application and release of the setting in cooperation with the system resource manager 21, the network RM 24, the storage RM 25, and the like. Consequently, it is possible to quickly and reliably add or delete a server corresponding to change in service load.

The SQC manager 29 monitors change in service load in cooperation with an SQC agent 118a. When a load of a specific service exceeds a predetermined maximum threshold or falls below a predetermined minimum threshold, the SQC manager 29 notifies the ASCC core 28 to that effect.

The domain management servers 50 and 60 manage resources in a domain or a plurality of domains. The domain management server 50 includes a system resource domain manager 51, the server sub RM 52, the software sub RM 53, the network sub RM 54, and a domain resource DB 55.

The domain management server 60 is of the same configuration as the domain management server 50, and therefore, the components of the domain management server 60 are not shown in FIG. 3 and description thereof is deemed not necessary.

The system resource domain manager 51 performs information collection, setting process, and the like related to resources that belong to each of the domains in cooperation with the server sub RM 52, the software sub RM 53, and the network sub RM 54.

The system resource domain manager 51 transmits to and receives from data networking equipment such as the site management server 20, an FW 90, and the SLB 100, as well as to and from the servers 110a to 110c to be managed.

The server sub RM 52 performs boot, shutdown, collection of information about hardware, setting, and the like in cooperation with the server RM 22 and the server RM agent 112a.

The software sub RM 53 performs software installation, setting, collection of information about software, and the like for each of the servers 110a to 110c in cooperation with the software RM 23 and the software RM agent 113a.

The network sub RM 54 performs information collection, setting, and the like related to a network in cooperation with the network RM 24 and the network RM agent 114a.

The domain resource DB 55 stores therein information acquired from the servers 110a to 110c and the system resource DB 26, when the server sub RM 52, the software sub RM 53, or the network sub RM 54 collects various information or specifies settings related to the servers 110a to 110c to be managed. In addition, the domain resource DB 55 stores therein a virtual operating system (OS) used for network boot of the servers 110a to 110c.

The router 80 performs routing of data packets in data communication via the Internet 70. The FWs 30, 40, 90, and 120 are networking equipments that prevent unauthorized access to each of the servers 110a to 110c, 140a to 140c, and 150a to 150c.

The SLBs 100 and 130 are load balancers that distribute and transfer information-processing requests for the servers 110a to 110c or 140a to 140c to a plurality of the servers 110a to 110c or 140a to 140c. Although not shown in FIG. 3, switches are also connected in upstream sides and downstream sides of the SLBs 100 and 130.

The servers 110a to 110c, 140a to 140c, and 150a to 150c perform various information processes. The server 110a includes a resource manager agent 111a, the server RM agent 112a, the software RM agent 113a, the network RM agent 114a, a storage RM agent 115a, the AP managing unit 116a, the AP managing unit 116a, the ASCC satellite 117a, and the SQC agent 118a.

The servers 110b, 140a, 140b, 150a, and 150b are of the same configuration as the server 110a. Therefore, the components of the servers 110b, 140a, 140b, 150a, and 150b are not shown in FIG. 3, and description thereof is deemed not necessary.

The servers 110c, 140c, and 150c are those that are pooled, and do not include each of the resource manager agent 111a, the server RM agent 112a, the software RM agent 113a, the network RM agent 114a, the storage RM agent 115a, the AP managing unit 116a, the ASCC satellite 117a, and the SQC agent 118a.

When the server 110c, 140c, or 150c is set as a server available for tasks, a computer program that realizes each of the function units is installed on the server 110c, 140c, or 150c, which is executed to realize each of the function units.

The resource manager agent 111a receives a request for executing process such as setting and information collection from the domain management server 50 of the system resource domain manager 51 for the server 110a, and performs processes in cooperation with the server RM agent 112a, the software RM agent 113a, the network RM agent 114a, and the storage RM agent 115a.

The server RM agent 112a boots and shuts down the server 110a, collects information about hardware, specifies settings, and the like. The software RM agent 113a performs software installation, setting, and collection of information about software for the server 110a.

The network RM agent 114a performs information collection, setting, and the like related to a network connected to the server 110a. The storage RM agent 115a performs information collection, setting, and the like related to a storage connected to the server 110a. The AP management unit 116a performs processing for incorporating an application and processing for setting an application.

The ASCC satellite 117a performs boot, stop, and the like of a user application in cooperation with the ASCC core 28. Because the ASCC satellite 117a performs boot, stop, and the like of a user application in cooperation with the ASCC core 28, it is possible to quickly cope with change in service load.

The SQC agent 118a monitors service load in cooperation with the SQC manager 29. Because the SQC agent 118a monitors service load in cooperation with the SQC manager 29, the ASCC core 28 can perform control corresponding to change in service load.

The storages 160a to 160c are used by the servers 110a to 110c that belong to the web domain 190, the servers 140a to 140c that belong to the AP domain 200, and the servers 150a to 150c that belong to the DB domain 210. The storage 160d is a storage that is pooled. The storages 160a to 160d are constituted of RAID devices.

A virtual local area network (VLAN) is set as a network that connects between the servers 110a to 110c that belong to the web domain 190, the servers 140a to 140c that belong to the AP domain 200, and the servers 150a to 150a that belong to the DB domain 210.

Figure 4:
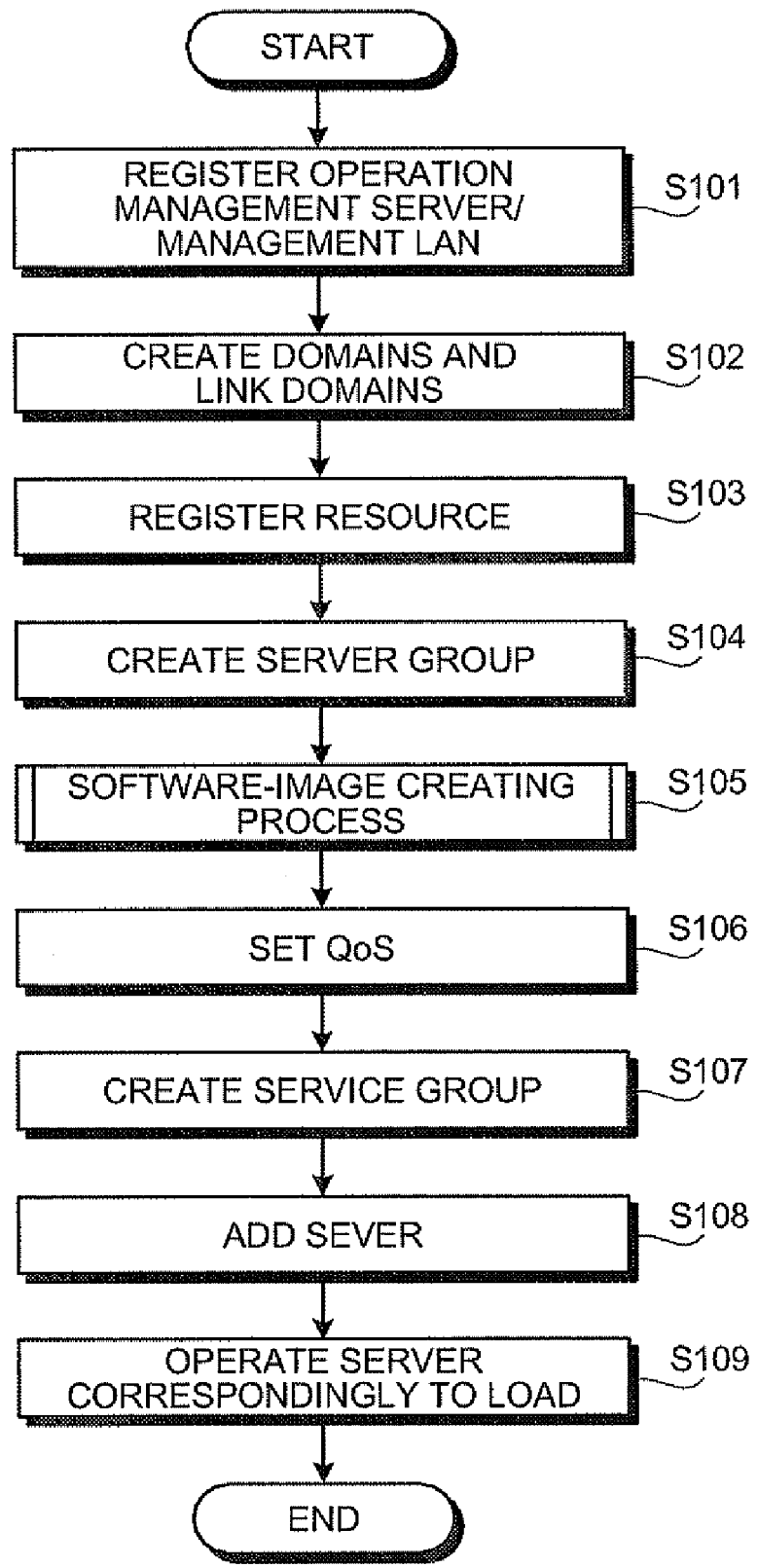
FIG. 4 is a flowchart of the process of assigning a server to a task.

A processing procedure of assigning a server to a task is explained next. FIG. 4 is a flowchart of the process of assigning a server to a task.

Incidentally, a computer program (hereinafter, "operation management program") can be executed to realize the same function as the site management server 20, i.e., the system resource manager 21, the server RM 22, the software RM 23, the network RM 24, the storage RM 25, the AP-management control unit 27, the ASCC core 28, and the SQC manager 29. In the following explanation, it is assumed that the operation management program is previously installed on the site management server 20.

Besides, a computer program can be executed to realize the same function as the domain management server 50, i.e., the system resource domain manager 51, the server sub RM 52, the software sub RM 53, and the network sub RM 54. This computer program is previously installed on the domain management servers 50.

A computer program can be executed to realize the same function as the servers 110, i.e., the resource manager agent 111a, the server RM agent 112a, the software RM agent 113a, the network RM agent 114a, the storage RM agent 115a, the AP managing unit 116a, the ASCC satellite 117a, and the SQC agent 118a. This computer program is previously installed on the servers 110. The same applies to the servers 110b, 140a, 140b, 150a, and 150b.

As shown in FIG. 4, the system resource manager 21 of the site management server 20 registers an operation management server and a management LAN (step S101). The operation management server and the management LAN are the site management server 20, the domain management server 50, and the LAN used for managing management target resources such as the servers 110a to 110c, 140a to 140c, and 150a to 150c, and the SAN 170.

The process performed at step S101 is explained in detail below. FIG. 5 is an example of site data 300 in which information on an operation management server is registered. The site data 300 contains items such as site name, site management server name, and domain management server name.

The site name is information for identifying a site that includes a resource to be managed. The site management server name is information for identifying the site management server 20 set to manage the site. The domain management server name is information for identifying the domain management servers 50 and 60 set to manage domains set in the site.

FIG. 6 is an example of domain management server data 310 in which information on the domain management servers 50 and 60 is registered. The domain management server data 310 contains items such as domain management server name and management subnet name.

The domain management server name is the same information as the domain management server name explained in connection with FIG. 5. The management subnet name is information for identifying a subnet (a management subnet) in which a resource is to be managed by the domain management servers.

FIG. 7 is an example of management subnet data 320 in which information on subnets to be managed is registered. The management subnet data 320 contains items such as management subnet name, network address, netmask, and default gateway.

The management subnet name is the same information as the management subnet name explained in connection with FIG. 6. The network address is a network address for identifying the management subnet. The netmask is a netmask that defines which bits in an IP address are to be used as the network address. The default gateway is information on an IP address for identifying a default gateway used for transmitting data to outside the management subnet.

At step S101, the system resource manager 21 receives information on a site, a site management server, and a domain management server set by the user operating the operation management client 10 and registers the information in the site data 300 as shown in FIG. 5.

The system resource manager 21 receives information on the domain management server and a management sub-network set by the user operating the operation management client 10 and registers the information in the domain management server data 310 shown in FIG. 6.

Thereafter, the system resource manager 21 registers information on network address, netmask, and default gateway, which correspond to the management subnet previously described in connection with FIG. 6, to the management subnet data 320 as shown in FIG. 7.

In addition, the system resource manager 21 notifies the AP-management control unit 27 of occurrence of an event such as addition to or deletion from the servers 110*a* to 110*c*, 140*a* to 140*c*, and 150*a* to 150*c*, and sets commands for executing various processes in cooperation with the AP-management control unit 27.

FIG. 8 is an example of middleware cooperation IF data 330 containing commands for performing various processes in cooperation with middleware. The middleware cooperation IF data 330 contains items such as middleware name, target event, timing, location, and execution command.

The middleware name is information on middleware with which the system resource manager 21 performs processes. The target event is information on events that the system resource manager 21 requests the middleware to execute. The timing is information on timing at which the system resource manager 21 transmits a request for executing processes to the middleware (before or after a process for the target event)

The location is information on locations where the middleware executes a command (a "manager" or an "agent"). The "manager" indicates that the command is executed on the site management server 20, while the "agent" indicates that the command is executed on the servers 110*a* to 110*c*, 140*a* to 140*c*, and 150*a* to 150*c* to be managed. The execution command is information on commands that notifies the middleware of occurrence of various events.

Referring back to FIG. 4, the system resource manager 21 creates domains and links the domains (step S102). The processes performed at step S102 is explained in detail below.

FIG. 9 is an example of server domain data 340 containing information on server domains to which the servers 110*a* to 110*c*, 140*a* to 140*c*, and 150*a* to 150*c* belong.

Specifically, the server domain data 340 contains items such as server domain name, server architecture name, and management subnet name. The server domain name is information for identifying a domain to which the servers 110*a* to 110*c*, 140*a* to 140*c*, and 150*a* to 150*c* belong.

The server architecture name is information for identifying central processing unit (CPU) architecture of the servers 110*a* to 110*c*, 140*a* to 140*c*, and 150*a* to 150*c* that belong to each of the server domains. The management subnet name is the same information as the management subnet name shown in FIG. 6.

At step S102, the system resource manager 21 receives information on settings of the server domains and the server architectures specified by the administrator by operating the operation management client 10, and registers received information to the server domain data 340. The server domains are set in units of the management subnet set at step S101.

The system resource manager 21 sets server groups belonging to respective server domains and sets a pool group shared among the server groups and a pool group exclusively used by a specific server group.

In this case, the server group is created by classifying servers in the same server domain into one or more groups. The pool group is a pool of the servers assigned to each of the server groups.

FIG. 10 is an example of pool group data 350 containing information on pool groups. Specifically, the pool group data 350 contains items such as pool group name, type, and server domain name.

The pool group name is information for identifying a pool of each of the servers described above. The type is information that indicates whether the pool group is to be shared by a plurality of the server groups or to be exclusively permitted for usage by specific server groups. The server domain name is the same information as the server domain name explained in connection with FIG. 9.

The system resource manager 21 assigns the pool group to each of the server domains. When the server domain includes a plurality of the sever groups, the system resource manager 21 assigns the pool group exclusive to the server groups.

Thereafter, the system resource manager 21 receives information on a storage domain set by the user operating the operation management client 10 and registers the information in the system resource DB 26 as storage domain data 360.

FIG. 11 is an example of the storage domain data 360 containing information on storage domains. Specifically, the storage domain data 360 contains items such as storage domain name and redundancy of path. The storage domain name is information for identifying a set storage domain. The redundancy of path is information on redundancy of a data communication path on the SAN.

The system resource manager 21 receives information on network subdomains set by the user operating the operation management client 10 and registers the information in the system resource DB 26 as network subdomain data 470 explained below.

The network subdomains are subdomains obtained by further dividing a network domain to which a plurality of network devices for connecting servers belonging to different server domains belongs.

FIG. 12 is a schematic diagram for explaining network domains and network subdomains. In FIG. 12, switches 430a, 430b, 450a, and 450b and SLBs 460a and 460b connect servers 380a to 380e belonging to a Web domain 370 and servers 400a to 400e belonging to an AP domain 390.

The switches 430a and 430b constitute a Web-Back network subdomain 420 and the switches 450a and 450b constitute an AP-Front network subdomain 440.

The Web-Back network subdomain 420, the AP-Front network subdomain 440, the SLB 460a, and the SLB 460b constitute a Web-AP network domain 410.

FIG. 13 is an example of the network subdomain data 470 containing information on network subdomains. Specifically, the network subdomain data 470 contains items such as network subdomain name, switch model, and switch management IP.

The network subdomain name is information for identifying the network subdomains explained with reference to FIG. 12. The switch model is information on models of switches belonging to the network subdomains. The switch management IP is information on IP addresses assigned to the respective switches for management.

The system resource manager 21 receives information on network domains set by the user operating the operation management client 10 and registers the information in the system resource DB 26 as network domain data 480.

FIG. 14 is an example of the network domain data 480 containing information on network domains. Specifically, the network domain data 480 contains items such as network domain name, front network subdomain name, connection system, apparatus name, back network subdomain name, and redundancy system.

The network domain name is identification information for identifying the network domain explained with reference to FIG. 12. The front network subdomain name is identification information for identifying, when the network domain is divided into two network subdomains with the SLBs 460a and 460b as a boundary as shown in FIG. 12, a network subdomain closer to the Internet 70.

The connection system is information on a system for connecting network devices such as the switches 430a and 430b belonging to the front network subdomain and network devices such as the switches 450a and 450b belonging to a back network subdomain explained later. For example, as this system, there are a system for connecting the network devices with a load balancer, a system for connecting the network devices with a firewall, and the like. The apparatus name is identification information for identifying the network devices.

The back network subdomain name is identification information for identifying, when the network domain is divided into two network subdomains with the SLBs 460a and 460b as boundaries, a network subdomain more distant from the Internet 70. The redundancy system is information indicating a system for redundancy at the time when data communication paths are redundant in the network domain.

The system resource manager 21 receives information on connection apparatuses of the network subdomains set by the user operating the operation management client 10 and registers the information in the system resource DB 26 as load distribution apparatus data 490. The connection apparatuses of the network subdomains refer to apparatuses such as the SLBs 460a and 460b explained with reference to FIG. 12.

FIG. 15 is an example of the load distribution apparatus data 490 containing information on load distribution apparatuses. Specifically, the load distribution apparatus data 490 contains items such as load distribution apparatus name, management IP, model name, SNMP community name, and ID/password.

The load distribution apparatus name is a name for identifying the connection apparatuses of the network subdomains. The management IP is information on IP addresses assigned to the respective connection apparatuses for management of the connection apparatuses. The model name is identification information of models of the connection apparatuses.

The simple network management protocol (SNMP) community name is information specifying SNMP communities to which the domain management servers 50 and 60 and the site management server 20 that manage the connection apparatuses and the connection apparatuses belong. The ID/password is information on IDs and passwords necessary for accessing the connection apparatuses.

The system resource manager 21 receives information on network groups set by the user operating the operation management client 10 and registers the information in the system resource DB 26 as network sub-group data 660 explained below.

The network sub-groups are obtained by dividing, when a server group is set for servers belonging to server domains, a network for connecting server groups belonging to different server domains into a plurality of networks.

Figure 16:
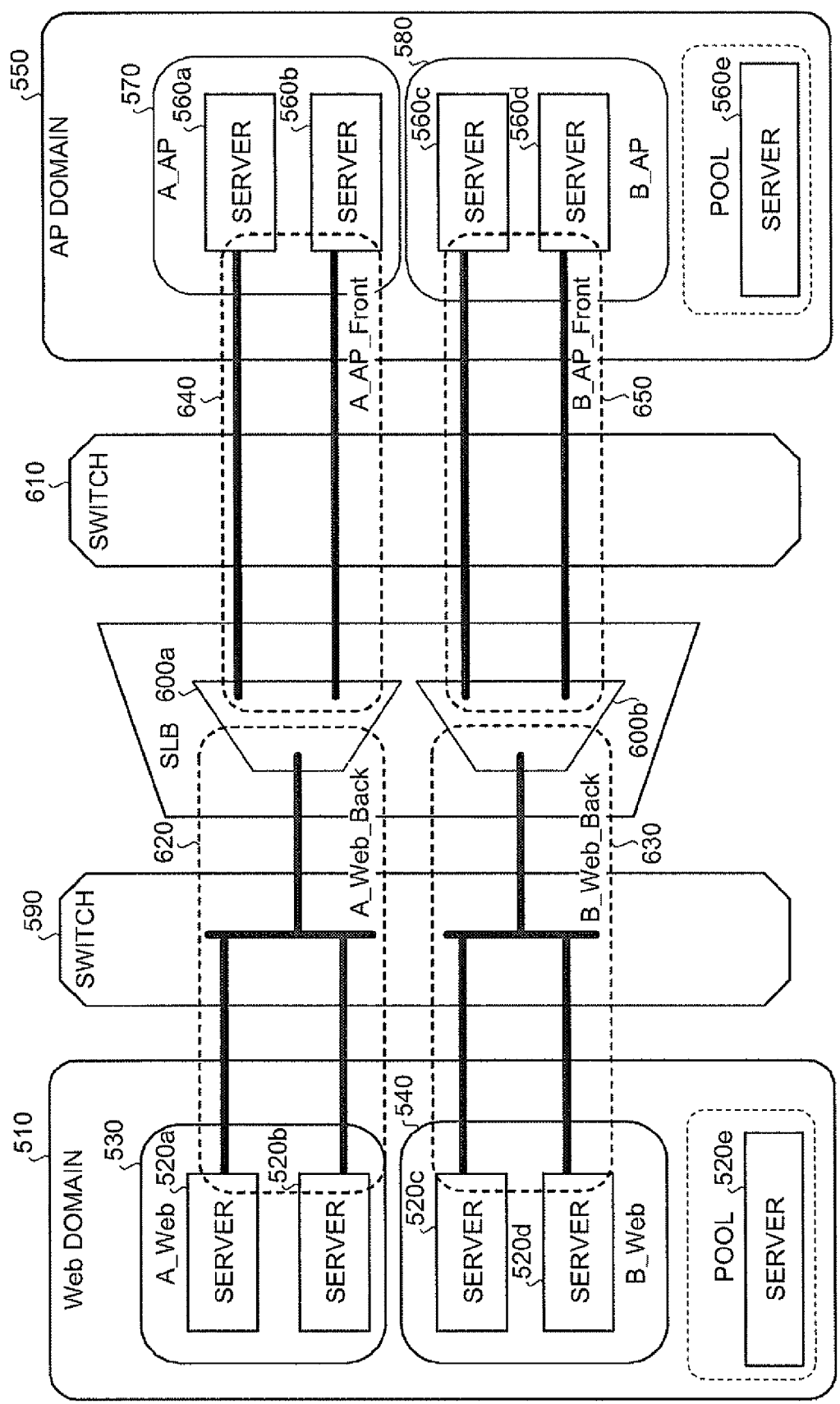
FIG. 16 is a schematic diagram for explaining an example of a structure of network sub-groups.

FIG. 16 is a schematic diagram for explaining an example of a structure of a network sub-group. In FIG. 16, switches 590 and 610 and SLBs 600a and 600b connect servers 520a to 520e belonging to a Web domain 510 and servers 560a to 560e belonging to an AP domain 550.

The servers 520a and 520b constitute an A_Web server group 530, the servers 520c and 520d constitute a B_Web server group 540, the servers 560a and 560b constitute an A_AP server group 570, and the servers 560c and 560d constitute a B_AP server group 580.

A network connecting the A_Web server group 530 and the SLB 600a constitutes an A_Web_Back network sub-group 620. Networks connecting the B_Web server group 540 and the SLB 600b constitute a B_Web_Back network sub-group 630. Networks connecting the SLB 600a and the A_AP server group 570 constitute an A_AP_Front network sub-group 640. Networks connecting the SLB 600b and the B_AP server group 580 constitute a B_AP_Front network sub-group 650.

FIG. 17 is an example of the network sub-group data 660 containing information on network sub-groups. Specifically, the network sub-group data 660 contains items such as network sub-group name, network subdomain name, sub-network, and redundancy sub-network.

The network sub-group name is identification information for identifying the network sub-group explained by citing the example with reference to FIG. 16. The network subdomain name is identification information for identifying network subdomains to which the network sub-groups belong.

The sub-network is information on a network address and a sub-network mask assigned to the network sub-groups. The redundancy sub-network is information on network addresses and sub-network masks assigned to a network including data communication lines added excessively when networks belonging to the network sub-group are made redundant using a plurality of data communication lines.

Thereafter, the system resource manager 21 receives information on a correspondence relation among server domains set by the user operating the operation management client 10 and registers the information in the system resource DB 26 as inter-server-domain link data 670.

FIG. 18 is an example of the inter-server-domain link data 670 containing information on the correspondence relation among the server domains. Specifically, the inter-server-domain link data 670 contains items such as front server domain name, network domain name, and back server domain name.

The front server domain name is identification information for identifying a server domain closer to the Internet 70 side of the server domains on both the sides of the network domain shown in FIG. 12. The network domain name is identification information of the network domain explained with reference to FIG. 12. The back server domain name is information indicating a server domain on a side more distant from the Internet 70 of the server domains on both the sides of the network domain shown in FIG. 12.

The system resource manager 21 receives information on a correspondence relation between server domains and storage domains set by the user operating the operation management client 10 and registers the information in the system resource DB 26 as inter-server/storage-domain link data 680.

Figure 19:
FIG. 19 is an example of inter-server/storage-domain link data containing information on a correspondence relation between server domains and storage domains.

FIG. 19 is an example of the inter-server/storage domain link data 680 containing information on the corresponding relation between server domains and storage domains. Specifically, the inter-server/storage-domain link data 680 contains items such as server domain name and storage domain name. The server domain name is the same information as the server domain name shown in FIG. 9. The storage domain name is the same information as the storage domain name shown in FIG. 11.

Referring back to FIG. 4, the system resource manager 21 registers server resources and storage resources to be managed (step S103). The process performed at step S103 is explained in detail below.

First, when the user operates the operation management client 10 and selects a management sub-network in which a server is registered, the system resource manager 21 receives information on the management sub-network selected by the user.

The system resource manager 21 also receives information on servers to be managed, which is input by the administrator by operating the operation management client 10, from the operation management client 10, and stores received information in the domain resource DB 55 of the domain management server 50 as network boot server data 690. Subsequently, the servers registered are network booted, and registered as the server resources after various information on the severs are acquired.

Figure 20:
FIG. 20 is an example of network boot server data containing information on servers subjected to network boot.

FIG. 20 is an example of the network boot server data 690 containing information on network boot servers. specifically, the network boot server data 690 contains items such as MAC address, IP address, and host name.

The MAC address is information on a MAC address of the server. The IP address is information on an IP addresses assigned to the server. The host name is information on a name assigned to the server.

When the system resource manager 21 receives information on an MAC address inputted by the user of the server that performs the network boot, the system resource manager 21 automatically assigns an IP address and a host name to a server corresponding to the MAC address.

The system resource manager 21 performs network boot on the server to which the IP address and the host name are assigned, by using the virtual OS stored in the domain resource DB 55 of the domain management server 50, in cooperation with the system resource domain manager 51 of the domain management server 50.

The server sub RN 52, the resource manager agent 111a, and the server RM agent 112a work together to collect information on hardware of the server and transmit collected information to the system resource domain manager 51.

Thereafter, the system resource manager 21 acquires the information on the hardware of the server from the system resource domain manager 51 and stores the information in the system resource DB 26 as management target server data 700 explained below.

When the user operates the operation management client 10 to input setting information as to whether SAN boot for booting up the server is to be performed from the storages 160a to 160d connected via the SAN 170, the system resource manager 21 receives the setting information and registers the setting information in the management target server data 700.

FIG. 21 is an example of the management target server data 700 containing information on servers to be managed. Specifically, the management target server data 700 contains items such as server name, IP address, MAC address, server architecture name, model name, SAN boot, and status.

The server name is a name for identifying a server to be managed. The IP address is an IP address that is assigned to the server. The MAC address is a MAC address of the server. The server architecture name is information for identifying CPU architecture of the server. The model name is information that indicates the model of the server. The SAN boot is setting information as to whether the storages 160a to 160b connected to the server via the SAN 170 perform SAN boot to boot the server. The status is information that indicates whether an error is occurring in the server.

The user designates a MAC address and selects a server that performs network boot. However, a server may be selected automatically. Specifically, when the user operates the operation management client 10 to set information on a number of servers automatically selected, the system resource manager 21 receives the setting information from the operation management client 10.

The system resource manager 21 selects servers of specified number, and registers information on an IP address and a host name of the servers to the network boot server data 690 shown in FIG. 20.

In cooperation with the system resource domain manager 51 in the domain management server 50, the system resource manager 21 performs network boot on the servers assigned the IP address and the host name using the virtual OS stored in the domain resource DE 55 in the domain management server 50.

With the cooperation of the server sub RM 52, the resource manager agent 111a, and the server RM agent 112a, information on the MAC address, server architecture, model, and status of each server is collected and transmitted to the system resource domain manager 51.

After that, the system resource manager 21 obtains the information on the MAC address, server architecture, model, and status of each server from the system resource domain manager 51. The system resource manager 21 stores the information in the system resource DB 26 as the management target server data 700.

Subsequently, the system resource manager 21 registers a storage device to be managed. Examples of the storage device include fiber channel (FC) switch and RAID device.

Specifically, when an administrator inputs information on the IP address of a storage to be registered as a management target with respect to each management subnet shown in FIG. 7, the system resource tanager 21 receives the information from the operation management client 10. The system resource manager 21 stores information on a storage device corresponding to the IP address in the system resource DB 26, thereby registering the storage device.

The system resource manager 21 adds the servers registered to the management target server data 700 shown in FIG. 21 to a server domain. Specifically, when the administrator specifies a server and a server domain where the server is to be added by operating the operation management client 10, the system resource manager 21 receives the information on the server and the server domain from the operation management client 10.

Referring to the management target server data 700 shown in FIG. 21, the system resource manager 21 checks whether the server architecture of the server matches server architecture registered to the server domain data 340 shown in FIG. 9.

The system resource manager 21 retrieves the management target server data 700 shown in FIG. 21, and checks that SAN boot is to be performed on the server.

The system resource manager 21 checks a wire connection state of a network of the server added to the server domain. Specifically, the system resource manager 21 reads the inter-server-domain link data 670 shown in FIG. 18 and acquires information on a front server domain and a back server domain corresponding to the server domain.

The system resource manager 21 reads the network domain data 480 shown in FIG. 14 and acquires information on a front subdomain and a back subdomain corresponding to the network domain.

Thereafter, the system resource manager 21 reads the network subdomain data 470 shown in FIG. 13 and specifies switches corresponding to the front subdomain and the back subdomain.

The system resource manager 21 requests the network RM 24 and the network sub RM 54 to check the connection between the server and the switches. Moreover, the network RM 24 and the network sub RM 54 requests the network RM agent 114*a* to check the connection between the server and the switches and acquires a check result.

When there is no problem in the connection between the server and the switches, the system resource manager 21 stores, in association with the pool groups explained with reference to FIG. 10, information on the server in the system resource DB 26 as provisioning configuration data 710.

Figure 22:
FIG. 22 is an example of provisioning configuration data containing information on groups to which servers belong.

FIG. 22 is an example of the provisioning configuration data 710 containing information on groups to which servers belong. Specifically, the provisioning configuration data 710 contains items such as server name, pool group name, server group name, storage sub-group name, and accessibility.

The saver name is the same information as described in connection with FIG. 21. The pool group name is the same information as described in connection with FIG. 10. The server group name is information for identifying a server group when servers on the same server domain are classified into one or more groups. At this point, information on the server group name has not been registered.

The storage sub-group name is information for identifying a storage group when storages on the same storage domain are classified into one or more groups and assigned to each server in the server group. At this point, information on the storage sub-group name has not been registered. The accessibility is information that indicates whether a server is allowed to access storages. At this point, information on the accessibility has not been registered.

After registering the saver name and the pool group name to the provisioning configuration data 710, the system resource manager 21 registers the storage device, which has been previously registered, in a storage domain.

Specifically, when the user operates the operation management client 10 to designate a storage domain and a storage device registered in the storage domain, the system resource manager 21 receives information on the storage domain and the storage device from the operation management client 10.

The system resource manager 21 reads the inter-server/storage-domain link data 680 shown in FIG. 19 and specifies a server domain corresponding to the storage domain.

Moreover, the system resource manager 21 checks, in cooperation with the storage RM 25 and the storage RM agent 115*a*, uniformity of the connection between servers belonging to the server domain specified and storage devices belonging to the storage domain.

Figure 23:
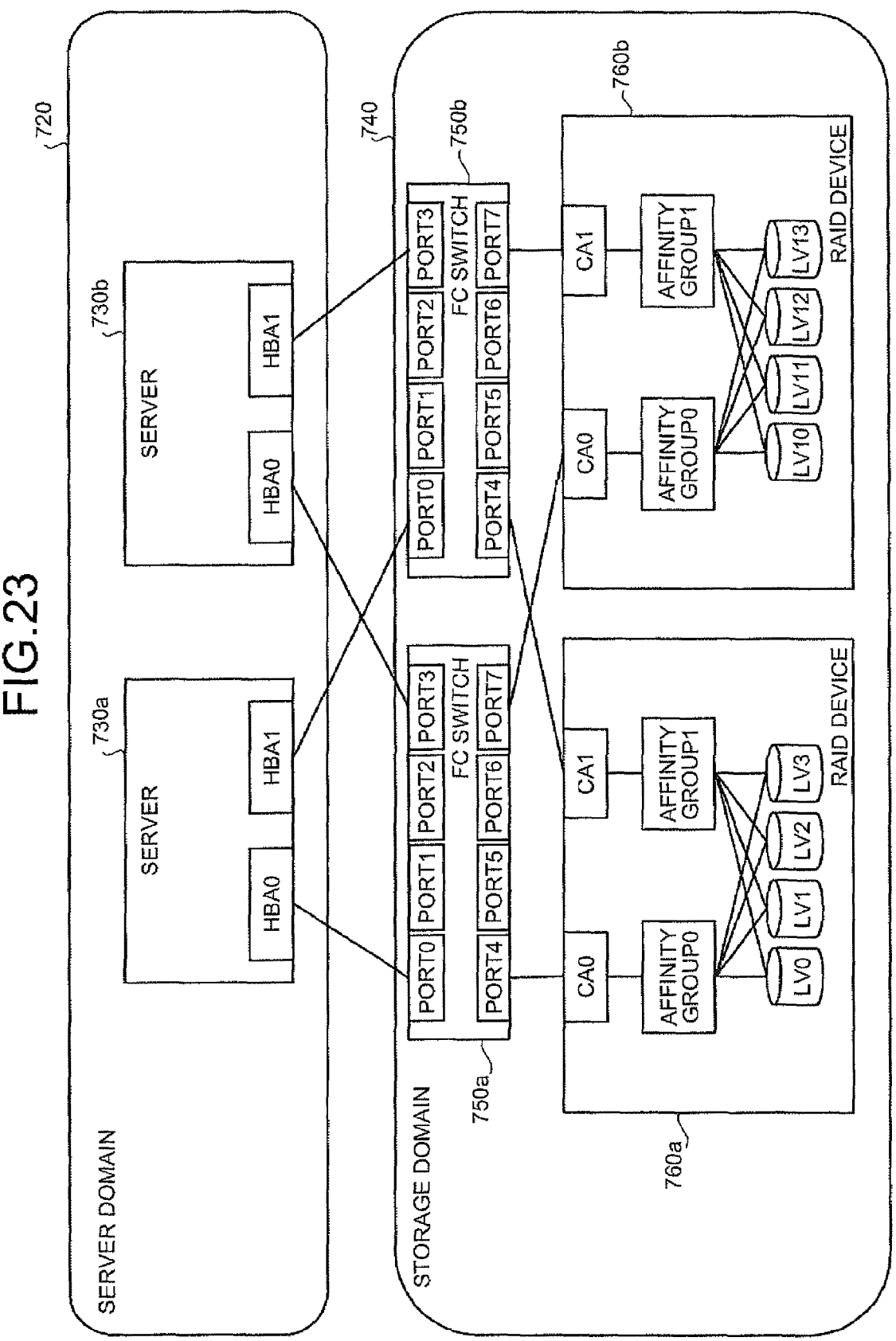
FIG. 23 is an example of the connection between servers and storage devices having a uniform connection state.

FIG. 23 is an example of the connection between servers and storage devices having a uniform connection state. In the example of FIG. 23, a connection state between an FC switch 750*a* belonging to a storage domain 740 and servers 730*a* and 730*b* belonging to a server domain 720 and a connection state between an FC switch 750*b* belonging to the storage domain 740 and the servers 730*a* and 730*b* are uniform.

A connection state between the FC switches 750*a* and 750*b* and a RAID device 760*a* belonging to the storage domain 740 and a connection state between the FC switches 750*a* and 750*b* and a RAID device 760*b* belonging to the storage domain 740 are uniform.

Figure 24:
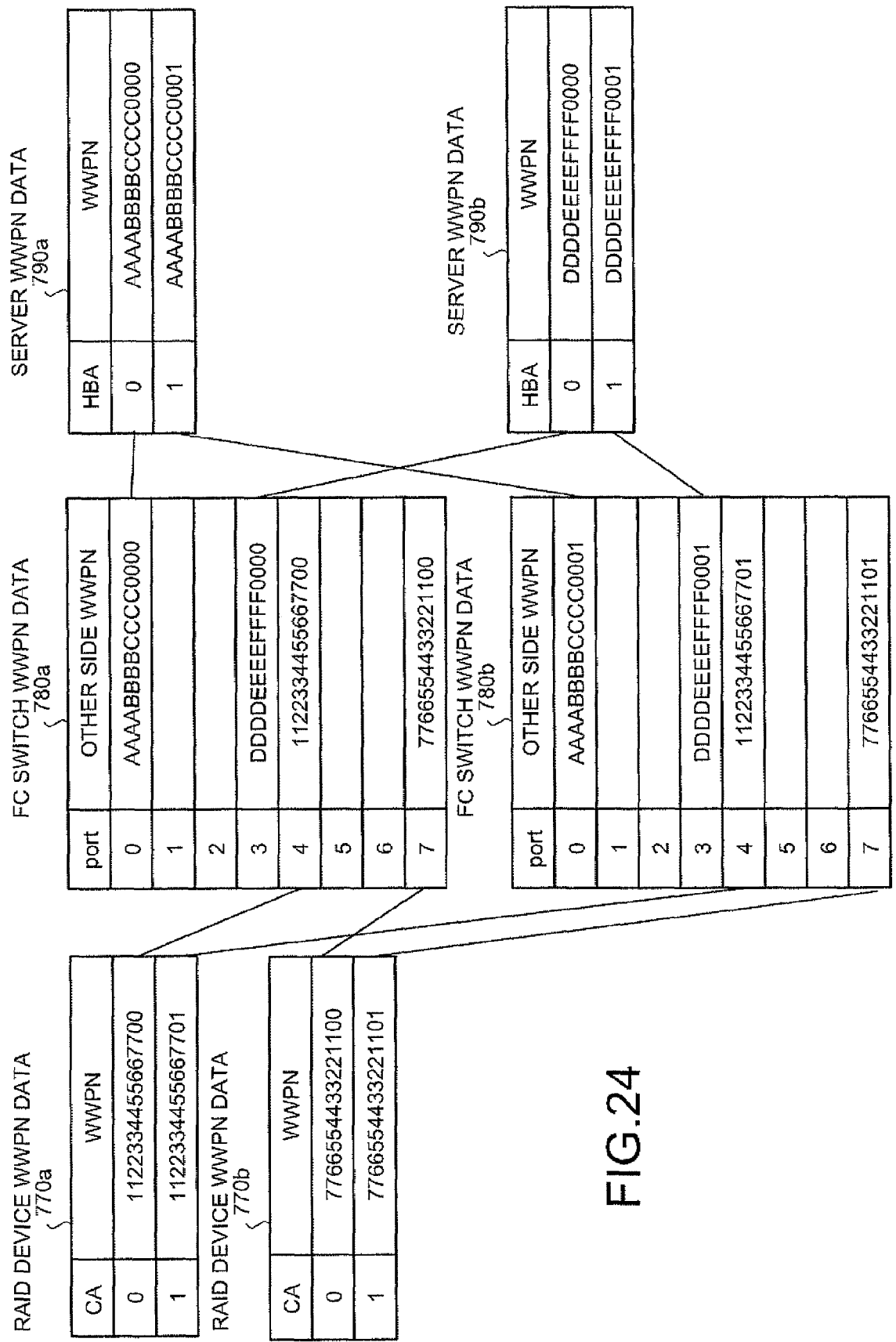
FIG. 24 is a schematic diagram for explaining processing for checking uniformity of the connection based on a WWPN.

The system resource manager 21 checks uniformity of the connection based on information on a world wide port name (WWPN). In that case, the system resource manager 21 reads information on multiplicity of paths of the storage domains from the storage domain data 360 shown in FIG. 11, and checks redundancy. FIG. 24 is a schematic diagram for explaining processing for checking uniformity of the connection based on the WWPN.

FIG. 24 depicts RAID device WWPN data 770*a* and 770*b* stored by the RAID devices 760*a* and 760*b*, FC switch WWPN data 780*a* and 780*b* stored by the FC switches 750*a* and 750*b*, and server WWPN data 790*a* and 790*b* stored by the servers 730*a* and 730*b* shown in FIG. 23.

The RAID device WWPN data 770*a* and 770*b* store information on a channel adapter (CA) and a WWPN. The CA is identification information of channel adapters held by the RAID devices 760*a* and 760*b*. The WWPN is information on WWPNs assigned to the channel adapters held by the RAID devices 760*a* and 760*b*.

FC switch WWPN data 780*a* and 780*b* store information on a port and a partner WWPN. The port is identification information of ports of the FC switches 750*a* and 750*b*. The partner WWPN is information on WWPNs assigned to the channel adapters of the RAID devices 760*a* and 760*b* connected to the ports of the FC switches 750*a* and 750*b* or information on WWPNs assigned to host bus adapters (HBA) of the servers 730*a* and 730*b* connected to the ports of the FC switches 750*a* and 750*b*.

The server WWPN data 790*a* and 790*b* store information on an HBA and a WWPN. The HBA is identification information of HBAs held by the servers 730*a* and 730*b*. The WWPN is information on WWPNs assigned to the HBA held by the servers 730*a* and 730*b*.

The system resource manager 21 collects the RAID device WWPN data 770*a* and 770*b*, the FC switch WWPN data 780*a* and 780*b*, and the server WWPN data 790*a* and 790*b* from the RAID devices 760*a* and 760*b*, the FC switches 750*a* and 750*b*, and the servers 730*a* and 730*b* and checks a correspondence relation among the WWPNs. Consequently, the system resource manager 21 can check uniformity of connection states among the devices.

Thereafter, the system resource manager 21 registers, as storages for pools, a storage area of a logical unit (LUN) set in advance and a storage area of a LUN not set.

Subsequently, the system resource manager 21 creates a server group (step S104). The process performed at step S104 is explained more in detail.

First, the system resource manager 21 receives information on a storage template set by the user operating the operation management client 10 and registers the information in the system resource DB 26 as storage template data 800. The storage template is setting information concerning a structure of a storage for server group created later.

FIG. 25 is an example of the storage template data 800 containing information on storage templates. Specifically, the storage template data 800 contains items such as storage template name, disk type, disk name, necessity of reliability, degree of load, disk capacity, and boot disk.

The storage template name is identification information for identifying the template set. The disk type is information indicating a type of use of a disk belonging to the storage template.

For example, "root" indicates that the disk is used for storing system data, "local" indicates that the disk is used for storing data of individual servers, and "shared" indicates that the disk is used for storing data shared among the servers.

The disk name is assigned to each disk for identifying the disk. The necessity of reliability is information on reliability required for the disk. The degree of load is information on a degree of load applied to the disk. The disk capacity is a storage capacity of the disk. The boot disk is information indicating whether the disk is used for boot of a system.

Subsequently, the system resource manager 21 receives information on a server group set by the user operating the operation management client 10 and stores the information in the system resource DB 26 as server group data 810.

FIG. 26 is an example of the server group data 810 containing information on server groups. Specifically, the server group data 810 contains items such as server group name, server domain name, software distribution image name, the number of copies, storage template name, SAN boot, and automatic recovery.

The server group name is identification information of groups obtained by dividing servers included in an identical server domain into one or more groups. The server domain name is identification information of a server domain to which the server group belongs. The software distribution image name is information for identifying an image file of software distributed to servers belonging to the server group.

The number of copies indicates the number of copies of the software distribution image. The storage template name is the same information as the storage template name explained with reference to FIG. 25. The SAN boot is information indicating whether SAN boot for the servers belonging to the server group is performed. The automatic recovery is information indicating whether, when a failure occurs in a server of a scale-out structure in which a plurality of servers operate in cooperation with one another, a server is automatically added.

Thereafter, the system resource manager 21 registers information on a storage group corresponding to the server group in the system resource DB 26 explained below as server/storage group link data 820. The storage group is obtained by dividing storages included in an identical storage domain into one or more groups.

FIG. 27 is an example of the server/storage group link data 820 containing information on storage groups corresponding to server groups. Specifically, the server/storage group link data 820 contains items such as server group name, storage group name, and storage domain name.

The server group name is the same information as the server group name shown in FIG. 26. The storage group name is identification information of a storage group generated in association with each server group. The storage domain name is identification information of a storage domain to which the storage group belongs.

In generating a storage group, the system resource manager 21 reads information on a storage template associated with the server group from the server group data 810 shown in FIG. 26 and reads information on a disk type corresponding to the storage template from the storage template data 800 shown in FIG. 25.

The system resource manager 21 generates, for each disk type such as "root", "local", or "shared", a storage group for each server group and registers information on the storage group in the server/storage group link data 820.

Moreover, the system resource manager 21 reads information on a storage domain corresponding to the server domain to which the server group belongs from the inter-server/storage-domain link data shown in FIG. 19 and registers the information in the server/storage group link data 820.

Thereafter, the system resource manager 21 transmits a command for causing the AP managing unit 116a to recognize the addition of the server group to the AP managing unit 116a. Specifically, the system resource manager 21 transmits "issvgrp add" shown in FIG. 8 to the AP managing unit 116a.

Subsequently, the system resource manager 21 receives information on a correspondence relation among the server groups set by the user operating the operation management client 10 and registers the information in the system resource DB 26 as inter-server-group link data 830.

FIG. 28 is an example of the inter-server-group link data 830 containing information on the correspondence relation among server groups. Specifically, the inter-server-group link data 830 contains items such as front server group name, network group name, and back server group name.

The front server group name is identification information for identifying a server group closer to the Internet 70 side among server groups connected by a network group. The network group is a group of networks obtained by combining the network sub-groups explained with reference to FIG. 16 to connect server groups.

The network group name is identification information for identifying the network group. The back server group name is identification information for identifying a server group on a side distant from the Internet 70 among the server groups connected by the network group.

Thereafter, the system resource manager 21 stores information on the network group in the system resource DB 26 as network group data 850 explained below.

Specifically, first, the system resource manager 21 reads the inter-server-domain link data 670 shown in FIG. 18 and acquires information on a network domain set between two server domains.

The system resource manager 21 reads the network domain data 480 shown in FIG. 14 and acquires information on a front subdomain, a back subdomain, and an apparatus corresponding to the network domain.

The system resource manager 21 reads the network sub-group data 660 shown in FIG. 17, retrieves a network subdomain corresponding to the front subdomain and the network subdomain from the network sub-group data 660 and extracts an unused network sub-group among network sub-groups corresponding to the network subdomain retrieved.

Subsequently, the system resource manager 21 divides network devices corresponding to information on an apparatus read from the network domain data 480 shown in FIG. 14 into one or more groups and stores information on the groups in the system resource DB 26 as load distribution group data 840.

FIG. 29 is an example of the load distribution group data 840 containing group information of load distribution apparatuses. Specifically, the load distribution group data 840 contains items such as load distribution group name, load balancer name, and representative IP.

The load distribution group name is information for identifying groups obtained by dividing load balancers into one or more groups. The load balancer name is a name for identifying the load balancers. The representative IP is information on IP addresses assigned to the respective load distribution groups.

Thereafter, the system resource manager 21 stores, based on information on a correspondence relation among network domains, network sub-groups, load distribution groups, and the like belonging to the respective network groups, the information in the system resource DB 26 as network group data 850.

FIG. 30 is an example of the network group data 850 containing information on network groups. Specifically, the network group data 850 contains items such as network group name, network domain name, front network sub-group name, load distribution group name, and back network sub-group name.

The network group name is the same information as the network groups explained with reference to FIG. 28. The network domain name is the same information as the network domains explained with reference to FIG. 18.

The front network sub-group name corresponds to the network sub-group name explained with reference to FIG. 17, which is identification information for identifying a network sub-group closer to the Internet 70 side of the network sub-groups on both the side of the load distribution group.

The load distribution group name is the same information as the load distribution group name explained with reference to FIG. 29. The back network sub-group name corresponds to the network sub-group name explained with reference to FIG. 17, which is identification information for identifying a network sub-group on a side more distant from the Internet 70 of the network sub-groups on both the sides of the load distribution group.

The system resource manager 21 applies setting of a VLAN of a network sub-group to the switches registered in the network subdomain data 470 in FIG. 13 in association with the network RM 24 and the network sub RM 54.

Subsequently, the system resource manager 21 adds a first server to the server group and creates a software image of software installed on the server (step S105). This software-image creating process is explained more in detail below.

FIG. 31 is a detailed flowchart of software-image creation processing performed at step S105 in FIG. 4. First, when the user operates the operation management client 10 to designate a server and a server group in which the server is registered, the system resource manager 21 receives information on the server and the server group and registers the server in the server group (step S201).

The system resource manager 21 automatically sets a storage (step S202). The system resource manager 21 reads the server group data 810 in FIG. 26, retrieves a storage template corresponding to the server group, and acquires setting conditions for the storage template from the storage template data 800 in FIG. 25.

The storage RM 25 sets logical volumes in storages pooled to satisfy the setting conditions for the storage template acquired by the system resource manager 21 and allocating the storages in which the logical volumes are set to the server group.

Thereafter, the system resource manager 21 registers the logical volumes set in the RAID devices as storage sub-groups in association with the server groups to which the respective servers belong and sets an access right to the storage group of the servers. Specifically, the system resource manager 21 stores information on a server group name, a storage sub-group name, and accessibility as the provisioning configuration data 710 shown in FIG. 22.

FIG. 32 is an example of provisioning configuration data 960 in which storage sub-groups are set. The provisioning configuration data 960 is resultant after the information on server group name, storage sub-group name, and accessibility is added to the provisioning configuration data 710 shown in FIG. 22.

The network RM 24 sets a network for the servers registered in the server group. In other words, the network RM 24 automatically sets a VLAN and an IP address (step S203).

Specifically, the network RM 24 reads, from the inter-server-group link data 830 shown in FIG. 28, information on a network group having the server groups added with the servers as a front server group and a back server group.

The network RM 24 reads the network group data 850 shown in FIG. 30 and extracts front network sub-groups and back network sub-groups corresponding to the network group.

Thereafter, the network RM 24 reads the network sub-group data 660 shown in FIG. 17, retrieves network sub-groups corresponding to the front network sub-groups and the back network sub-groups, and assigns IP addresses to the servers based on information on sub-networks assigned to the network sub-groups.

Figure 33:
FIG. 33 is an example of IP address management data containing information on IP addresses assigned to servers.

FIG. 33 is an example of IP address management data 1040 containing information on the IP addresses assigned to the servers. The IP address management data 1040 is stored in the system resource DB 26 by the system resource manager 21.

The IP address management data 1040 contains items such as IP address and allocation destination. The IP address is information on the IP addresses assigned to the servers. The allocation destination is information for identifying the servers as allocation destinations of the IP addresses.

Subsequently, the network RM 24 allocates, based on the load distribution group data 840 shown in FIG. 29 and the network group data 850 shown in FIG. 30, a load distribution group having a representative IP address to the network groups corresponding to the server groups added with the servers. At this point, a load distribution function of a load balancer is in a stopped state.

Thereafter, the user installs software such as an OS, which is installed on the servers, in the storage sub-groups associated with the servers added to the server groups. In other words, the software RM 23 installs necessary software (step S204). The storage sub-group is formed by using the SAN technology.

Figure 34:
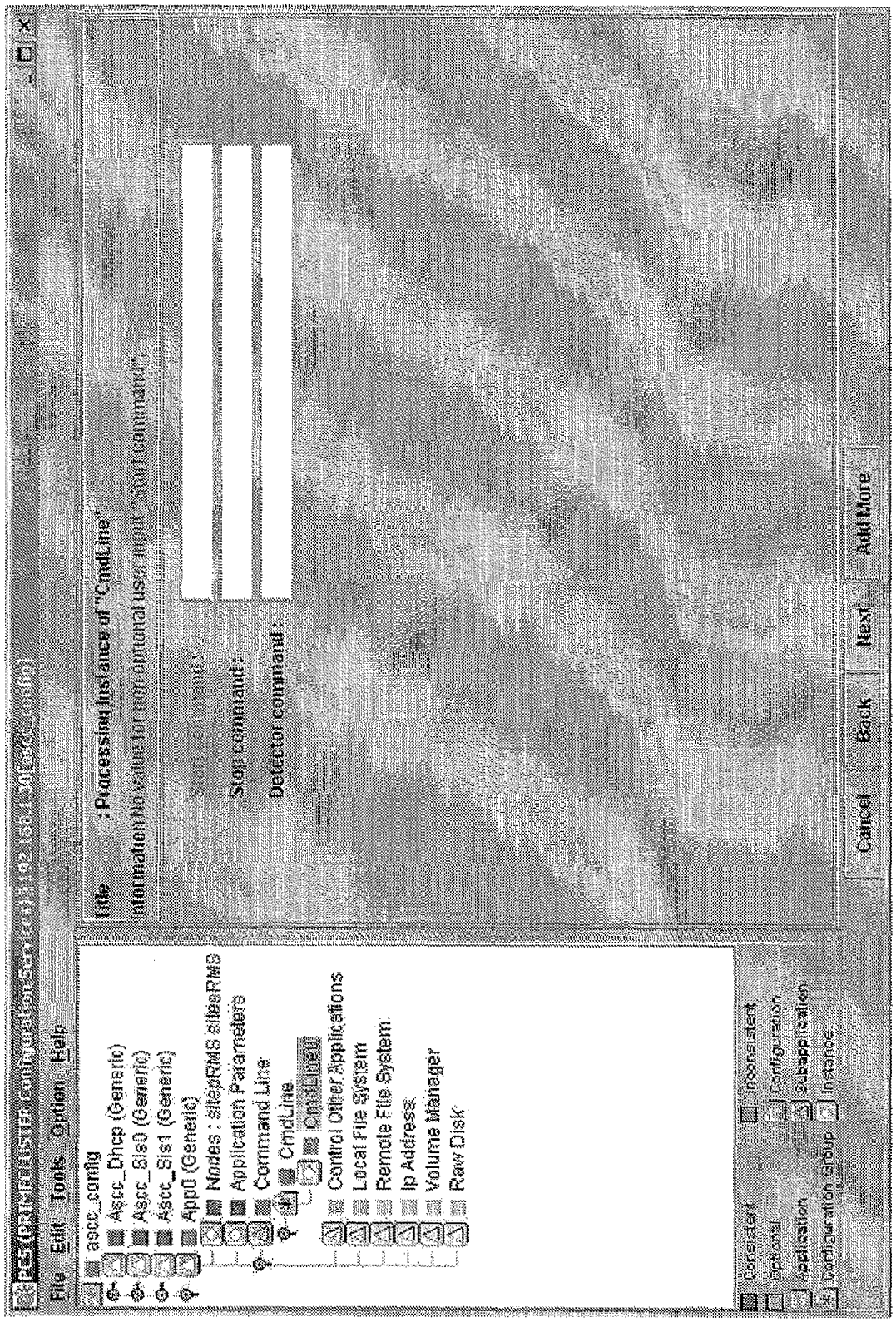
FIG. 34 is an example of a screen for receiving scripts used for booting, stopping, and checking a user program from a user.

The software RM 23 sets a user application (step S205). In other words, the software RM 23 receives scripts used for boot, stop, and check of a user program from a user and registers the scripts. FIG. 34 is an example of a screen for receiving the scripts used for booting, stopping, and checking of the user program from the user.

The software sub RM 53 creates a software image formed by an aggregate of software such as an OS, a device driver, and application software in cooperation with the software RM 23 and the software RM agent 113a and stores the software image created in the domain resource DB 55.

Specifically, the software RM 23 reads the middleware cooperation IF data 330 shown in FIG. 8. The software RM agent 113a transmits a command required to be executed before software image sampling to the AP managing unit 116a, which is a functional unit realized by middleware.

In other words, the software RM agent 113a transmits a command for stopping the function of the AP managing unit 116a and stops the function of the AP managing unit 116a. The software sub RM 53 shuts down systems of the servers. Moreover, the software sub RM 53 performs network boot of the servers using a provisional OS stored in the domain resource DB 55 of the domain management server 50 for the servers.

Thereafter, the software sub RM 53 creates a software image of software installed on the servers booted up (step S206). The software RM 23 registers information on the software image in the system resource DB 26 as software image management data 1050.

FIG. 35 is an example of the software image management data 1050 containing information on software images. Specifically, the software image management data 1050 contains items such as software image name, format, OS attribute, and software name.

The software image name is a name of a software image. The format is information indicating whether the software image is created in an archive format or a patch format. The OS attribute is information indicating whether the software image is a software image of an OS. The software name is a name of software for which the software image is created.

The software sub RM 53 creates, based on the software image created, a software distribution image distributed for other servers. Specifically, the software sub RM 53 creates a software distribution image including a set of software images of a plurality of pieces of software stored in a storage for a first server.

The system resource manager 21 stores information on the software distribution image in the system resource DB 26 as software distribution image management data 1060.

FIG. 36 is an example of the software distribution image management data 1060 containing information on software distribution images. Specifically, the software distribution image management data 1060 contains items such as software distribution image name, the number of copies, server architecture name, and software image/snapshot name.

The software distribution image name is a name of a software distribution image. The number of copies indicates the number of copies of the software distribution image. The server architecture name is identification information for identifying a CPU architecture of a server to which the software distribution image is distributed. The software image/snapshot name is identification information for identifying a software image or a snapshot included in the software distribution image.

The snapshot is a software image of software installed on the server at a specific point in time. The system resource manager 21 registers information on the snapshot in the system resource DB 26 as snapshot management data 1070.

Figure 37:
FIG. 37 is an example of snapshot management data containing information on snapshots.

FIG. 37 is an example of the snapshot management data 1070 containing information on a snapshot. Specifically, the snapshot management data 1070 contains items such as snapshot name and software image name. The snap shot name is a name of the snapshot. The software image name is identification information for identifying a software image included in the snapshot.

Thereafter, the software RM 23 automatically adds a middleware cooperation IF (step S207). In other words, the software RM 23 reads the middleware cooperation IF data 330 shown in FIG. 8. The software RM agent 113a transmits a command required to be executed after software image sampling to the AP managing unit 116a, which is a functional unit realized by middleware. Specifically, the software RM agent 113a transmits a command for starting the AP managing unit 116a stopped and starts the AP managing unit 116a.

When the user instructs shift of the server to a task mode, the network RM 24 automatically starts distribution by a load balancer (step S208). Specifically, the software RM agent 113a transmits a command for starting the AP managing unit 116a stopped and starts the AP managing unit 116a. The network RM 24 applies setting of a VLAN to the switches to connect the server to the VLAN, starts the load distribution function of the load balancer, and allocates the server as an object server to which loads are distributed.

Thereafter, the system resource manager 21 reads the middleware cooperation IF data 330 shown in FIG. 8 and transmits a command required to be executed after server group creation to the AP-management control unit 27, which is a functional unit realized by middleware.

Specifically, the system resource manager 21 transmits a command for causing the AP-management control unit 27 to recognize addition of a server group to the AP-management control unit 27. The AP-management control unit 27 performs installation, setting, and the like of application programs in the server in cooperation with the AP managing unit 116a and sets the server in a state in which the server is usable in tasks.

In this way, when a software image is created, the software RM 23 performs the processing for receiving the scripts used for boot, stop, and check of the user program from the user and registering the scripts. Consequently, it is possible to automatically perform boot and stop of the user program when servers are increased or decreased.

Referring back to FIG. 4, the system resource manager 21 sets QoS (step S106). Specifically, the system resource manager 21 receives, for each of services, an upper limit and a lower limit of a load, a minimum value and a maximum value of the number of servers, and priority order among the services and registers the same as service load data 1075.

Figure 38:
FIG. 38 is an example of service load data.
Figure 39:
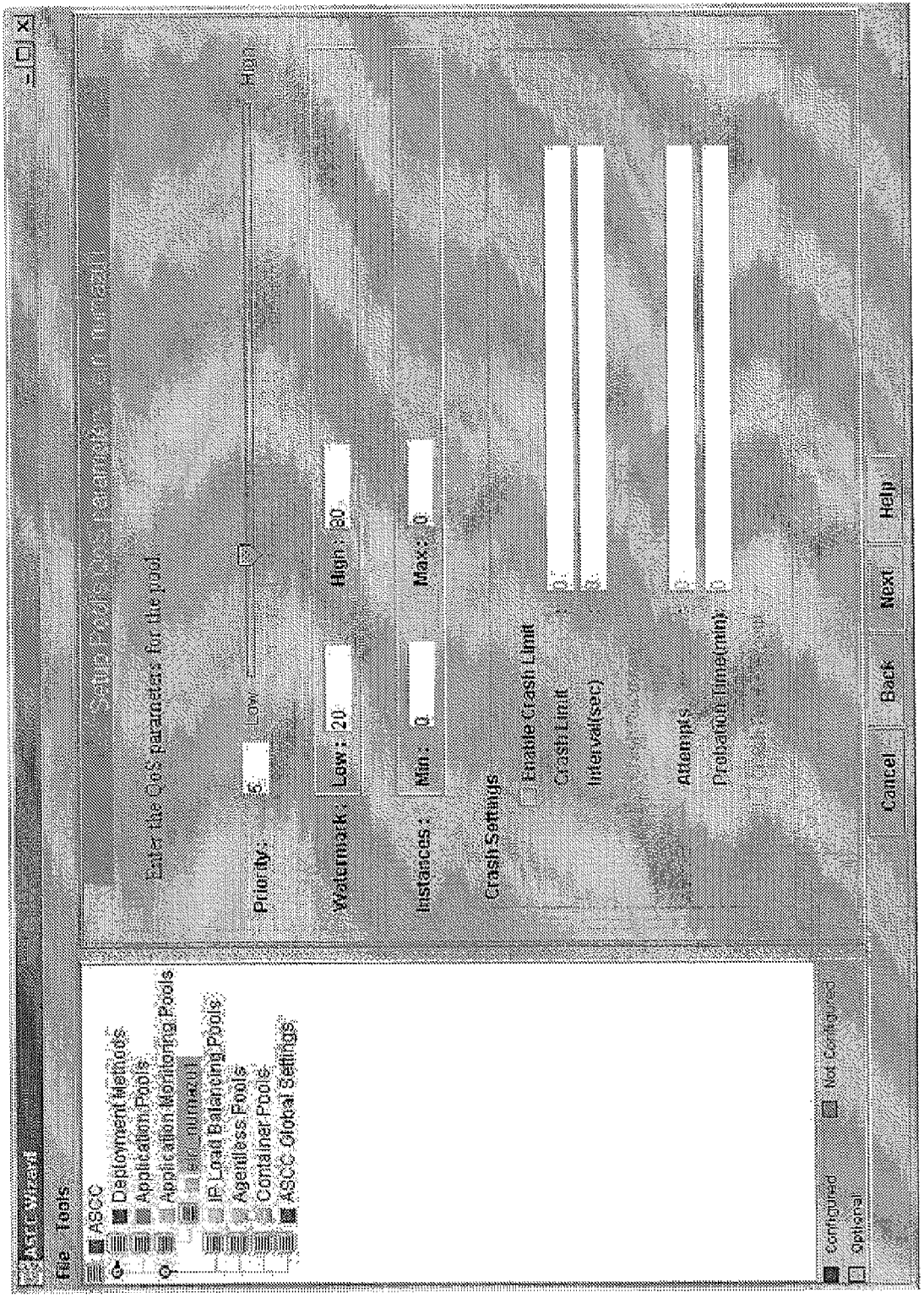
FIG. 39 is an example of a QoS setting screen.

FIG. 38 is an example of the service load data 1075. In the service load data 1075, for each of the services, a domain name, a service name, performance information indicating a minimum value, a maximum value, and a present state value of a load, priority, and the number of servers indicating a minimum number, a maximum number, and a present state number of servers are stored. An example of a QoS setting screen is shown in FIG. 39.

Thereafter, the system resource manager 21 receives information concerning services and information concerning service groups set by the administrator by operating the operation management client 10 and stores the information in the system resource DE 26 as service data 1181 and service group data 1182 explained below (step S107).

Figure 40:
FIG. 40 is an example of service data containing information on services.

FIG. 40 is an example of the service data 1181 containing information on services. Specifically, in the service data 1181 contains items such as service name, server group name, and state information.

The service name is information for identifying a service. The server group name is information for identifying a server group that provides the service. The state information is information indicating a state in which the service is provided by a server of the server group. When the state is normal, the state information is "normal" and, when the state is abnormal, the state information is "abnormal".

Figure 41:
FIG. 41 is an example of service group data containing information on service groups.

FIG. 41 is an example of service group data 1182 containing information on service groups. Specifically, the service group data 1182 contains items such as service group name and service name.

The service group name is information for identifying a service group. The service name is information concerning services that form the service group.

Thereafter, when the operation of the system is started, the system resource manager 21 adds, as initial setting, servers for the respective services in priority order (step S108). When the number of servers in operation for the services is smaller than the minimum number, if there is a server in a server pool, the system resource manager 21 adds the server to the server group from the server pool and boot the user application.

In adding the server, when a software distribution image created from software introduced in a first server is expanded in a storage sub-group associated with a second server, the software RM 23 stores information concerning the expanded software distribution image in the system resource DB 26.

FIG. 42 is an example of distribution management data 1080 containing information on distribution states of software distribution images. Specifically, the distribution management data 1080 contains items such as server name, storage sub-group name, software distribution image name, the number of copies, and state.

The server name is information for identifying servers to which storage sub-groups are assigned. The storage sub-group name is information for identifying storage sub-groups to which software distribution images are expanded. The software distribution image name is information for identifying the software distribution images expanded to the storage sub-groups. The number of copies is information on the number of copies of the software distribution images distributed. The state is information indicating distribution states of the software distribution images.

Figure 43:
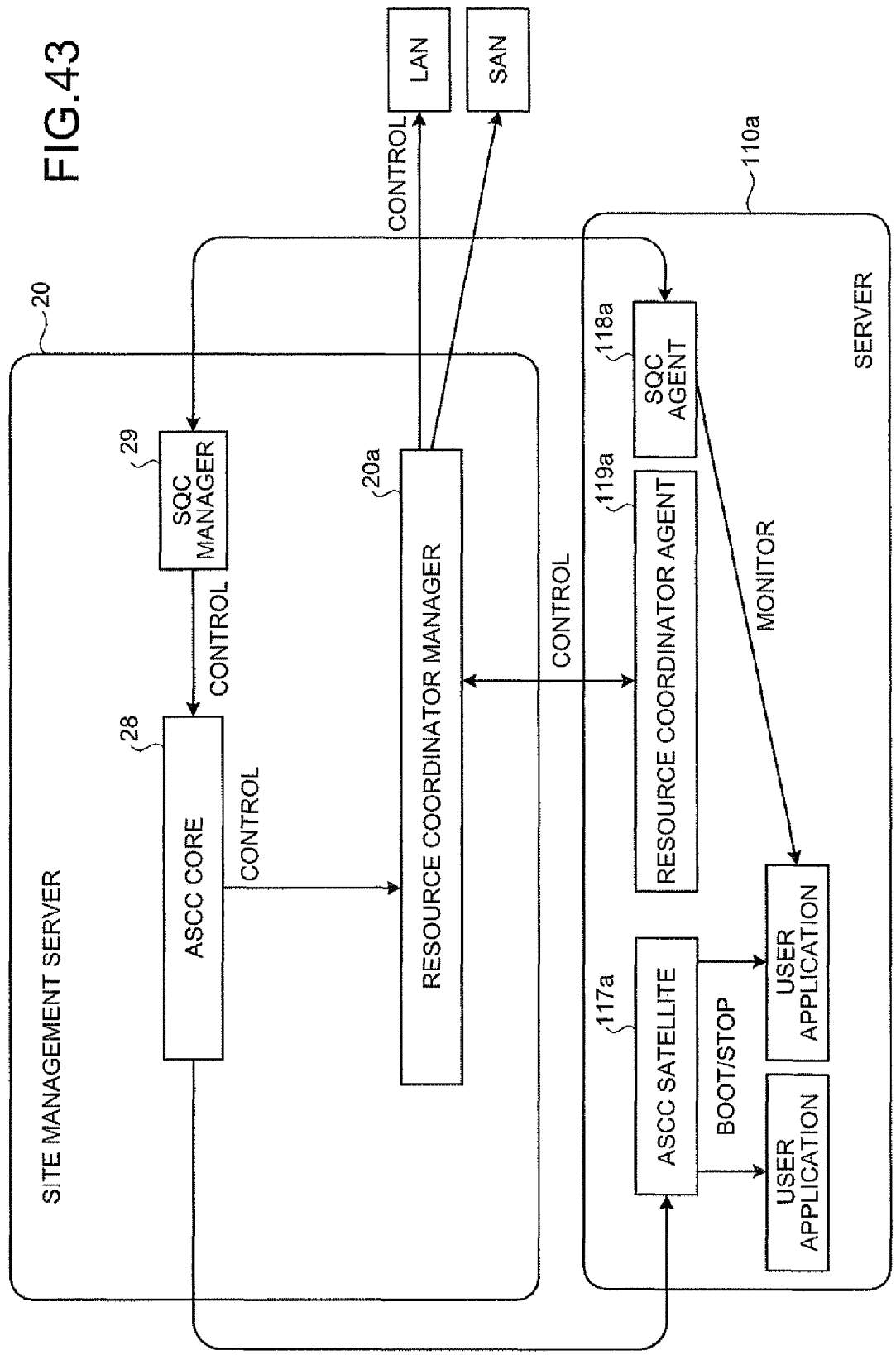
FIG. 43 is a schematic diagram for explaining server operation processing corresponding to a load performed by an ASCC core.

During the operation of the system, the ASCC core 28 operates server correspondingly to a load (step S109). FIG. 43 is a schematic diagram for explaining the server operation processing corresponding to a load performed by the ASCC core 28.

As shown in FIG. 43, the SQC manager 29 monitors a load of each of the services in cooperation with the SQC agent 118a. When the load exceeds the upper limit value or the load falls below the lower limit value, the SQC manager 29 notifies the ASCC core 28 to that effect. The ASCC core 28 controls setting of a LAN and a SAN via a resource coordinator manager 20a and instructs the ASCC satellite 117a to boot or stop a user application provided by the service.

The resource coordinator manager 20a is a general term of the system resource manager 21, the server RM 22, the software RM 23, the network RM 24, the storage RM 25, the system resource DB 26, and the AP-management control unit 27. A resource coordinator agent 119a shown in FIG. 43 is a general term of the resource manager agent 111a, the server RM agent 112a, the software RM agent 113a, the network RM agent 114a, the storage RM agent 115a, and the AP managing unit 116a shown in FIG. 3.

Figure 44:
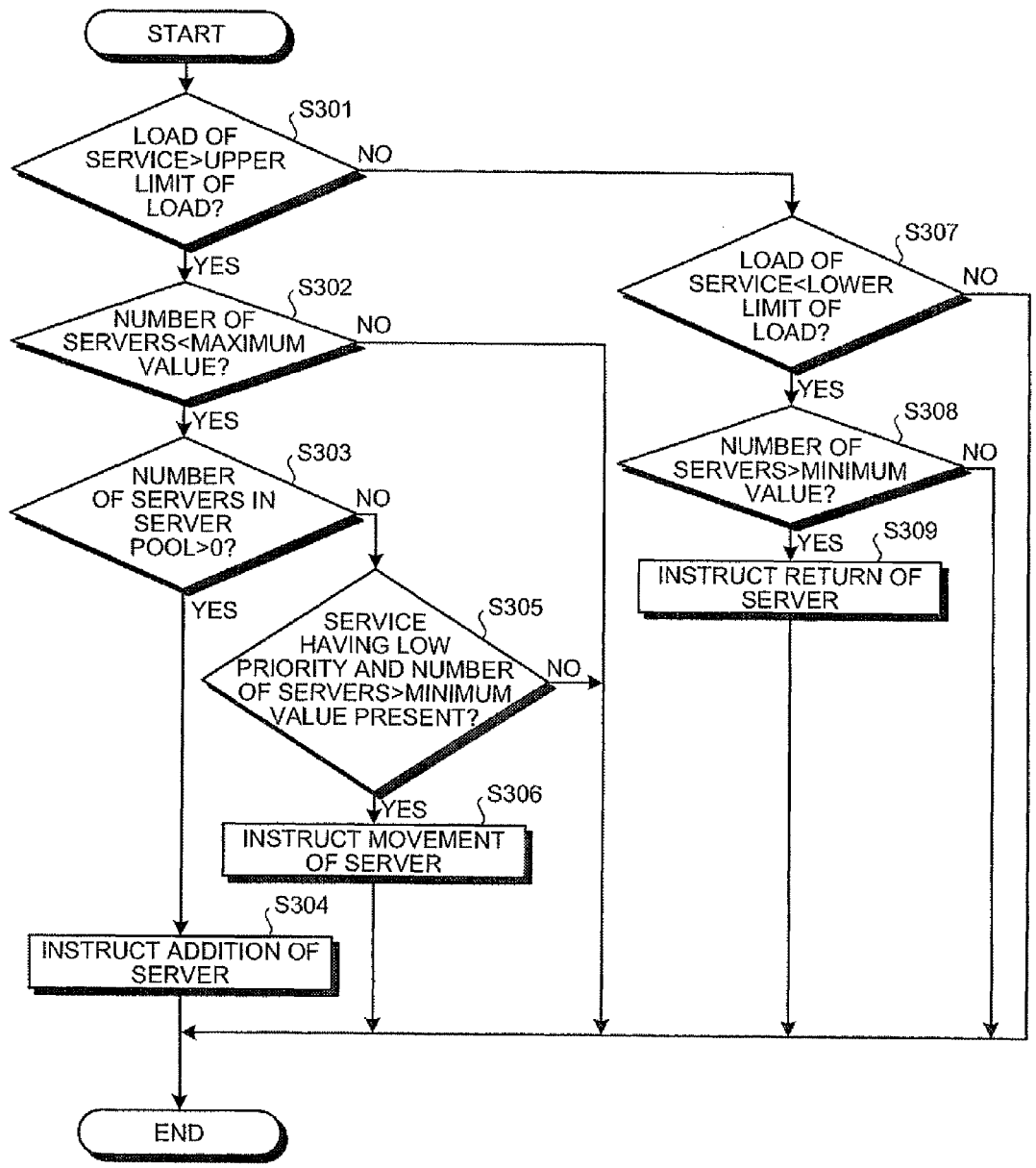
FIG. 44 is a flowchart of the server operation processing corresponding to a load performed by the ASCC core.

FIG. 44 is a flowchart of the server operation processing corresponding to a load performed by the ASCC core 28. As shown in FIG. 44, in the server operation processing corresponding to a load, the ASCC core 28 judges, based on notification from the SQC manager 29, whether service load is larger than the upper limit of the load (step S301). When the load is larger than the upper limit, the ASCC core 28 judges whether the number of servers is smaller than the maximum value (step S302).

As a result, when the number of servers is smaller than the maximum value, the ASCC core 28 judges whether the number of servers in the server pool is larger than 0 (step S303). When the number of servers in the server pool is larger than 0, the ASCC core 28 instructs the resource coordinator manager 20a and the ASCC satellite 117a to add a server from the server pool to a server group corresponding to the service (step S304).

On the other hand, when the number of servers in the server pool is not larger than 0, there is no idle server. Therefore, the ASCC core 28 judges whether a service, having a low priority and using a number of servers larger than the minimum value, is present in the other services (step S305). When there is such a service, the ASCC core 28 instructs the resource coordinator manager 20a and the ASCC satellite 117a to move a server from the service (step S306). When there is no such a service or when the number of servers is not smaller than the maximum value, a server cannot be added, and the ASCC core 28 finishes the processing.

When the load of the service is not larger than the upper limit, the ASCC core 28 judges whether the load of the service is smaller than the lower limit of load (step S307). When the load of the service is smaller than the lower limit, the ASCC core 28 judges whether the number of servers is larger than the minimum value (step S308).

When the number of servers is larger than the minimum value, the ASCC core 28 instructs the resource coordinator manager 20a and the ASCC satellite 117a to return the server to the server pool (step S309).

In this way, the ASCC core 28 control increase or decrease in the number of servers according to a state of service load. Consequently, it is possible to appropriately maintain a service level while efficiently using the servers.

Figures 45, 46:
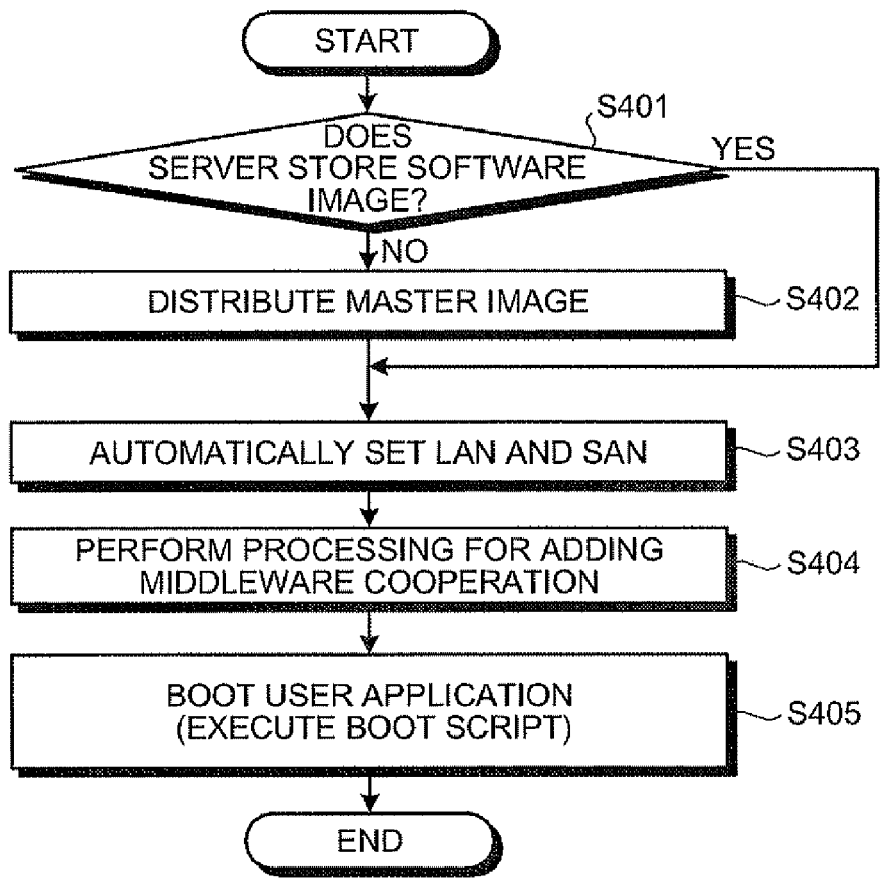
FIG. 45 is a flowchart of server addition processing performed by a resource coordinator manager and an ASCC satellite in cooperation with each other.
FIG. 46 is an example of operation server data.

FIG. 45 is a flowchart of server addition processing performed by the resource coordinator manager 20a and the ASCC satellite 117a in cooperation with each other. As shown in FIG. 45, the resource coordinator manager 20a judges whether a server to be added stores a software image (step S401). When the server does not store a software image, the resource coordinator manager 20a distributes a master image to the server (step S402).

The resource coordinator manager 20a automatically sets a LAN and a SAN (step S403), and performs processing for adding middleware cooperation (step S404).

The ASCC satellite 117a boots a user application corresponding to a service, a load of which increases, on the added server (step S405). In other words, the ASCC satellite 117a executes a boot script.

In this way, the resource coordinator manager 20a and the ASCC satellite 117a perform the processing for adding a server in cooperation with each other. Consequently, it is possible to quickly and reliably add the server.

After executing the boot script and booting the user application, the ASCC satellite 117a periodically executes a check script and checks an execution state of the user application. When abnormality is detected, the ASCC satellite 117a reboots the user application. When the ASCC satellite 117a fails in the reboot, the ASCC satellite 117a sets the server in a failure state. When the number of servers in operation is smaller than the minimum number of servers, the ASCC satellite 117a performs processing for adding a server from the server pool.

The resource coordinator manager 20a manages, for each of the services, a server in operation using operation server data 1090. FIG. 46 is an example of the operation server data 1090. As shown in FIG. 46, the operation server data 1090 contains items such as service name, server group name, and name of server in operation.

Figure 47:
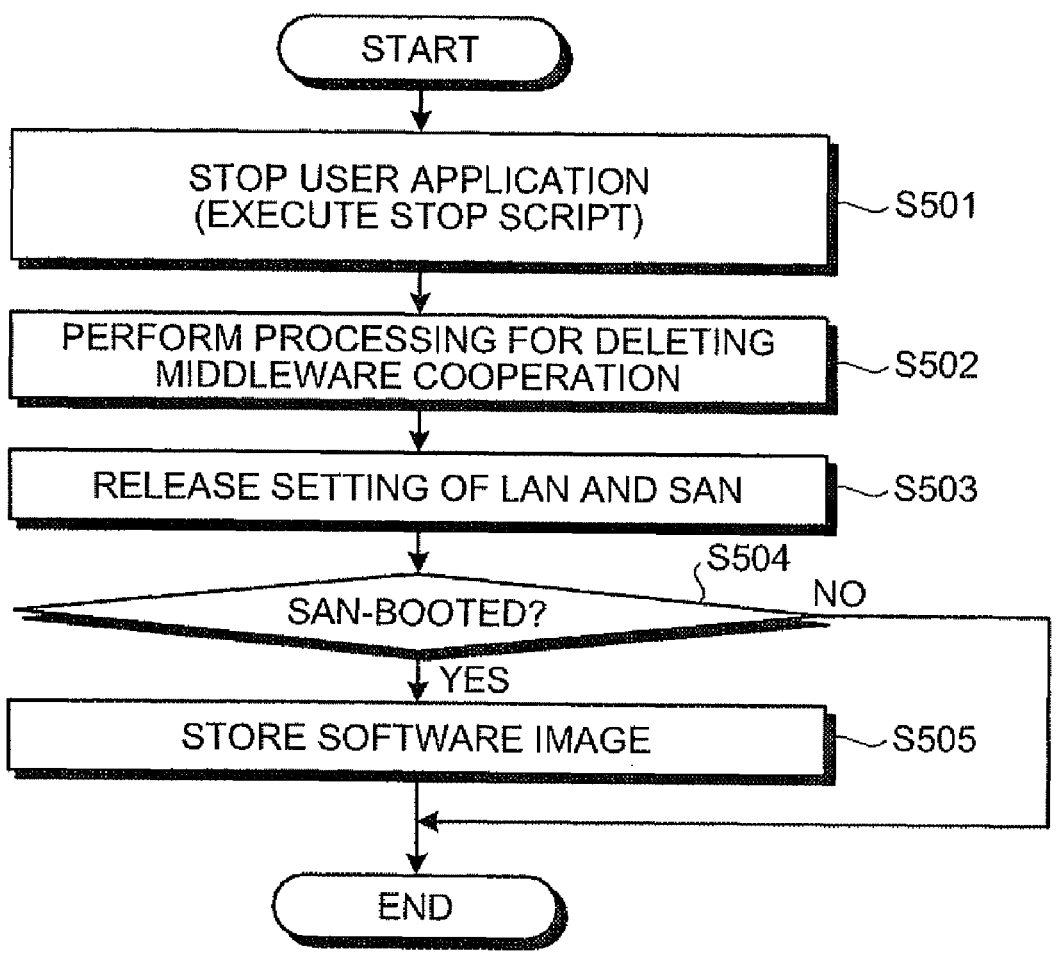
FIG. 47 is a flowchart of server return processing performed by the resource coordinator manager and the ASCC satellite in cooperation with each other.

FIG. 47 is a flowchart of server return processing performed by the resource coordinator manager 20*a* and the ASCC satellite 117*a* in cooperation with each other. As shown in FIG. 47, first, the ASCC satellite 117*a* stops a user application corresponding to a service that is executed in a server to be returned and a load of which decreases (step S501). In other words, the ASCC satellite 117*a* executes a stop script corresponding to the user application stopped in the server to be returned.

The resource coordinator manager 20*a* performs processing for deleting middleware cooperation (step S502), and releases the setting of the LAN and the SAN (step S503). The resource coordinator manager 20*a* judges whether the server to be returned is SAN-booted (step S504). When the server is SAN-booted, the resource coordinator manager 20*a* stores a software image (step S505).

In this way, the resource coordinator manager 20*a* and the ASCC satellite 117*a* returns the server to the server pool in cooperation with each other. Consequently, it is possible to quickly and reliably return the server.

Figure 48:
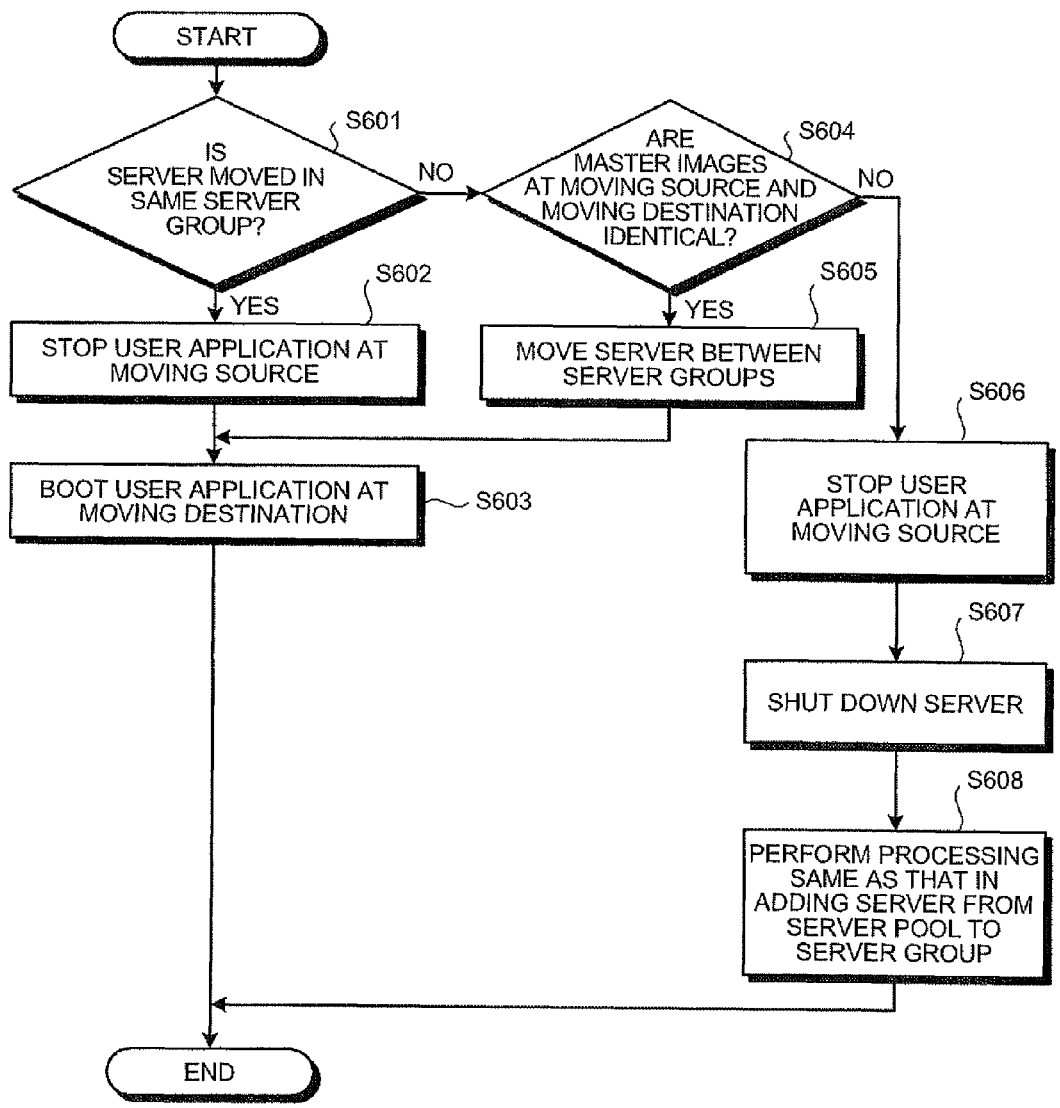
FIG. 48 is a flowchart of server movement processing performed by the resource coordinator manager and the ASCC satellite in cooperation with each other.

FIG. 48 is a flowchart of server movement processing performed by the resource coordinator manager 20*a* and the ASCC satellite 117*a* in cooperation with each other. As shown in FIG. 48, first, the resource coordinator manager 20*a* judges whether a moving source of a server and a moving destination of the server are the same server group (step S601). When the moving source and the moving destination are the same server group, the ASCC satellite 117*a* stops a user application that provides a service at the moving source (step S602), and boots a user application that provides a service at the moving destination (step S603).

On the other hand, when the moving source and the moving destination are the same, the resource coordinator manager 20*a* judges whether master images at the moving source and the moving destination of the server are identical (step S604). When the master images are identical, the resource coordinator manager 20*a* moves the server between the server groups (step S605). The ASCC satellite 117*a* boots the user application that provides the service at the moving destination (step S603).

When the master images at the moving source and the moving destination are not the same, the ASCC satellite 117*a* stops the user application that provides the service at the moving source (step S606), and shuts down the server (step S607). The resource coordinator manager 20*a* moves the server in the same manner as adding a server from the server pool to a server group (step S608).

In this way, when the server is moved, the resource coordinator manager 20*a* judges whether the server groups at the moving source and the moving destination of the server are identical. When the server groups are identical, the ASCC satellite 117*a* moves the server by performing stop of the user application that provides the service at the moving source and boot of the user application that provides the service at the moving destination. Therefore, it is possible to quickly shift a server.

Figure 49:
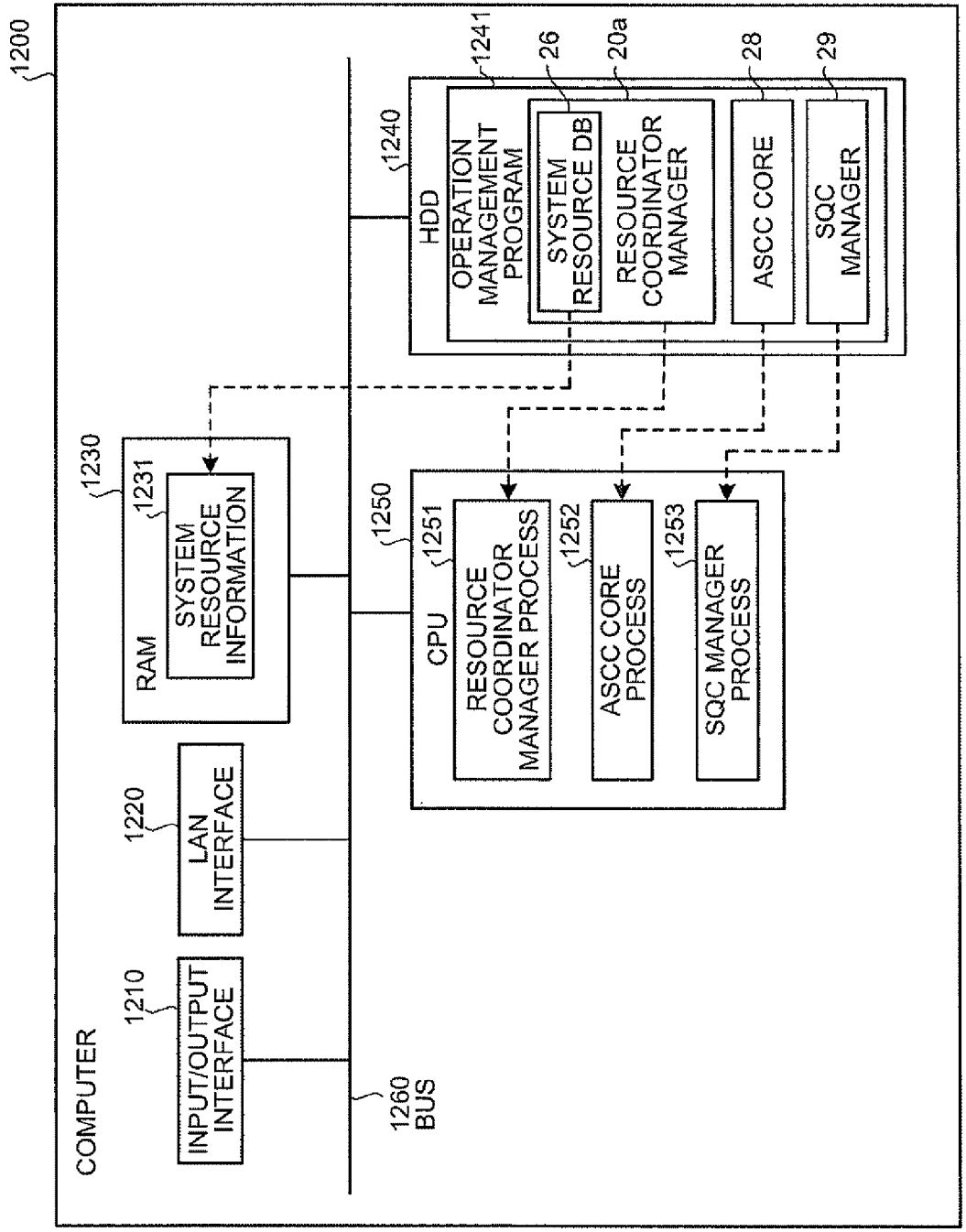
FIG. 49 is a schematic diagram of a computer that executes the operation management program according to the embodiment.

FIG. 49 is a schematic diagram of a computer 1200 that executes an operation management program 1241 according to the embodiment. The computer 1200 corresponds to the site management server 20.

The computer 1200 is constituted by connecting an input/output interface 1210, a LAN interface 1220, a random access memory (RAM) 1230, a hard disk drive (HDD) 1240, and a CPU 1250 to a bus 1260.

The input/output interface 1210 is connected to input devices such as a mouse and a keyboard and a display device such as a liquid crystal display. The LAN interface 1220 connects the computer 1200 to a LAN.

The RAM 1230 stores therein computer programs executed by the CPU 1250, data read out from the HDD 1240, and the like. The HDD 1240 stores therein the operation management program 1241. System resource information 1231 read out from the system resource DB 26 is stored in the RAM 1230.

The CPU 1250 executes the operation management program 1241 in the HDD 1240. The resource coordinator manager 20*a*, the ASCC core 28, and the SQC manager 29 of the operation management program 1241 are executed as a resource coordinator manger process 1251, an ASCC core process 1252, and an SQC manager process 1253, respectively.

The operation management program 1241 can be provided as being stored in a portable physical medium such as a flexible disk (FD), a compact disk-read only memory (CD-ROM), a magneto-optical (MO) disk, a digital versatile disk (DVD), a magneto-optical disk, and an integrated circuit (IC) card, in another computer connected to the computer 1200 via a network such as the Internet, etc., or in the HDD 1240.

As described above, in this embodiment, when a server is added in response to an increase in service load, the resource coordinator manager 20*a* automatically sets LAN and SAN, and the ASCC satellite 117*a* executes the boot script to boot a user application corresponding to the service. Therefore, it is possible to quickly and reliably add a server.

Moreover, when a server is returned to the server pool in response to a decrease in service load, the ASCC satellite 117*a* executes the stop script to stop a user application corresponding to the service, and the resource coordinator manager 20*a* automatically releases the setting of LAN and SAN. Therefore, it is possible to quickly and reliably return a server to the server pool.

In the explanation of this embodiment, the number of servers is increased or decreased by monitoring service load. However, a server can be added or returned in response to an instruction from a user to increase or decrease the number of servers.

As set forth hereinabove, according to an embodiment of the present invention, even when the user applications use the logical resources, a server can be added simply by booting the user applications. On the other hand, a server can be deleted simply by stopping the user applications. Therefore, the number of servers can be automatically increased or decreased according to a change in service load. Thus, it is possible to maintain an appropriate service level as well as to efficiently use the servers.

Moreover, a server can be added even when there is no idle server. Therefore, it is possible to flexibly cope with an increase in load. Besides, the number of servers assigned to a service is prevented from decreasing to be smaller than the minimum number of servers. Therefore, service level can be guaranteed.

Furthermore, the number of servers are quickly increased or decreased based on an instruction from a user. Therefore, it is possible to quickly cope with a change in load. In addition, servers are assigned to a service in a balanced manner. Therefore, it is possible to provide well-balanced services.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product for managing a plurality of servers each executing an identical user application to provide a service as a whole, comprising a computer usable medium having computer readable program codes embodied in the medium that, when executed, causes a computer to execute:
 setting, for addition of a server to execute the user application, automatically a local area network or a storage area network necessary for executing the user application in the server to be added, using site information, management server information and management subnet information, the site information including a name of a management server, the management server information relating a name of a management subnet to the name of the management server, the management subnet information relating network information to the name of the management subnet, the management server managing the server; and
 booting, upon addition of the server, the user application on the server.

2. The computer program product according to claim 1, further causing the computer to execute:
 stopping, for deleting a server that is executing the user application, the user application executed on the server; and
 releasing a local area network or a storage area network used by the user application stopped at the stopping.

3. The computer program product according to claim 2, further causing the computer to execute:
 monitoring a load of a service provided by the user application; and
 determining, based on the load monitored at the monitoring, whether to add or delete a server, wherein
 the setting includes setting, when addition of a server is determined at the determining, a local area network or a storage area network necessary for executing the user application in the server to be added, and
 the stopping includes stopping, when deletion of a server is determined at the determining, the user application executed on the server to be deleted.

4. The computer program product according to claim 3, further causing the computer to execute selecting, when there is no available server to be added when addition of a server is determined at the determining, a to-be-added server from servers assigned to other services based on priority of the services, wherein
 the setting includes setting, as required, a local area network or a storage area network in the to-be-added server selected at the selecting.

5. The computer program product according to claim 4, wherein, the selecting includes excluding, from the servers from which the to-be-added server is selected, servers assigned to a service a number of which decreases below a minimum number required for the service when a server is deleted from the servers assigned to the service.

6. The computer program product according to claim 4, wherein, when a server is assigned from a first service to a second service in an identical server group, the stopping includes stopping a user application corresponding to the first service, and the booting includes booting a user application corresponding to the second service.

7. The computer program product according to claim 2, further causing the computer to execute receiving an instruction to add or delete a server from a user, wherein
 the setting includes setting, upon receipt of an instruction for addition of a server at the receiving, a local area network or a storage area network necessary for executing the user application in the server to be added, and
 the stopping includes stopping, upon receipt of an instruction for deletion of a server at the receiving, the user application executed on the server to be deleted.

8. The computer program product according to claim 3, wherein,
 the determining includes determining, when number of servers assigned to a service is below a maximum number of servers required for the service and a load of the service is above a maximum threshold, to add a server to the servers assigned to the service, and
 the determining includes determining, when number of servers assigned to a service is above a minimum number of servers required for the service and a load of the service is below a minimum threshold, to delete a server from the servers assigned to the service.

9. An operation management method for managing a plurality of servers each executing an identical user application to provide a service as a whole, the method comprising:
 setting, using a central processing unit of a computer for addition of a server to execute the user application, automatically a local area network or a storage area network necessary for executing the user application in the server to be added, using site information, management server information and management subnet information, the site information including a name of a management server, the management server information relating a name of a management subnet to the name of the management server, the management subnet information relating network information to the name of the management subnet, the management server managing the server; and
 booting, upon addition of the server, the user application on the server.

10. An operation management apparatus that manages a plurality of servers each executing an identical user application to provide a service as a whole, the apparatus comprising:
 a setting unit that sets, for addition of a server to execute the user application, automatically a local area network or a storage area network necessary for executing the user application in the server to be added, using site information, management server information and management subnet information, the site information including a name of a management server, the management server information relating a name of a management subnet to the name of the management server, the management subnet information relating network information to the name of the management subnet, the management server managing the server; and
 a booting unit that boots, upon addition of the server, the user application on the server.

* * * * *